United States Patent
Kang et al.

(10) Patent No.: US 10,789,750 B2
(45) Date of Patent: Sep. 29, 2020

(54) MODELING METHOD AND APPARATUS USING FLUID ANIMATION GRAPH

(71) Applicant: SAMSUNG ELECTRONICS CO., LTD., Suwon-si (KR)

(72) Inventors: Nahyup Kang, Seoul (KR); Donghoon Sagong, Suwon-si (KR); Hyong Euk Lee, Suwon-si (KR); Hwiryong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 15/178,056

(22) Filed: Jun. 9, 2016

(65) Prior Publication Data
US 2017/0061666 A1    Mar. 2, 2017

(30) Foreign Application Priority Data
Aug. 27, 2015   (KR) .................. 10-2015-0120663
Feb. 4, 2016    (KR) .................. 10-2016-0014087

(51) Int. Cl.
*G06T 13/00*     (2011.01)
*G06F 16/22*     (2019.01)
(Continued)

(52) U.S. Cl.
CPC ............ *G06T 13/00* (2013.01); *G06F 3/0484* (2013.01); *G06F 16/22* (2019.01);
(Continued)

(58) Field of Classification Search
CPC ....... G06T 13/60; G06T 11/206; G06T 17/20; G06T 7/20; G06T 2207/10016;
(Continued)

(56) References Cited

U.S. PATENT DOCUMENTS 5,537,641 A * 7/1996 da Vitoria Lobo ..... G06T 13/60
                                                    345/419
5,731,819 A * 3/1998 Gagne ..................... G06T 17/20
                                                    345/647
(Continued)

FOREIGN PATENT DOCUMENTS

JP      11-353303 A      12/1999
JP      2011-81704 A     4/2011
(Continued)

OTHER PUBLICATIONS

Casas, Dan, et al. "Interactive Animation of 4D Performance Capture." *IEEE Transactions on Visualization and Computer Graphics* 19.5 (2013): 762-773. (12 pages, in English).
(Continued)

*Primary Examiner* — Chante E Harrison
(74) *Attorney, Agent, or Firm* — NSIP Law

(57) ABSTRACT

A modeling method searches for a sequence matched to a user input using a fluid animation graph generated based on similarities among frames included in sequences included in the fluid animation graph and models a movement corresponding to the user input based on a result of the searching. Provided also is a corresponding apparatus and a method for preprocessing for such modeling.

38 Claims, 19 Drawing Sheets

(51) Int. Cl.
  *G06F 16/901* (2019.01)
  *G06T 13/20* (2011.01)
  *G06F 3/0484* (2013.01)
  *G06T 7/20* (2017.01)
  *G06T 11/20* (2006.01)
  *G06T 15/50* (2011.01)

(52) U.S. Cl.
  CPC ............ *G06F 16/9024* (2019.01); *G06T 7/20* (2013.01); *G06T 11/206* (2013.01); *G06T 13/20* (2013.01); *G06T 15/503* (2013.01); *G06T 2207/10016* (2013.01); *G06T 2207/20221* (2013.01); *G06T 2210/24* (2013.01)

(58) Field of Classification Search
  CPC ....... G06T 2207/20221; G06T 2210/24; G06T 13/00; G06T 15/503; G06F 17/30312; G06F 17/30958; G06F 3/0484; G06F 16/22; G06F 16/9024; G06F 16/7837; G06F 13/60
  See application file for complete search history.

(56) References Cited

U.S. PATENT DOCUMENTS

| | | | |
|---|---|---|---|
| 6,611,736 | B1 | 8/2003 | Waite et al. |
| 8,204,725 | B1 | 6/2012 | Thuerey et al. |
| 8,219,370 | B1 | 7/2012 | DiVerdi et al. |
| 2003/0090484 | A1* | 5/2003 | Comair .................. G06T 13/60 345/420 |
| 2006/0106591 | A1* | 5/2006 | Bordes ................ G06F 15/7864 703/22 |
| 2006/0282243 | A1 | 12/2006 | Childs et al. |
| 2009/0267951 | A1* | 10/2009 | Chang ..................... G06T 13/60 345/474 |
| 2011/0307837 | A1* | 12/2011 | Cohen ................. G06F 3/04815 715/851 |
| 2015/0095006 | A1 | 4/2015 | Chentanez et al. |
| 2017/0076488 | A1* | 3/2017 | Stanton ................... G06T 13/60 |
| 2017/0243388 | A1* | 8/2017 | Jamriska ................ G06T 13/60 |

FOREIGN PATENT DOCUMENTS

| | | |
|---|---|---|
| JP | 2014-37677 A | 2/2014 |
| KR | 10-0705417 B1 | 4/2007 |

OTHER PUBLICATIONS

Extended European Search Report dated Jan. 23, 2017 in counterpart European Patent Application No. 16186108.3 (16 pages, in English).

Legg, Philip A., et al. "Transformation of an Uncertain Video Search Pipeline to a Sketch-Based Visual Analytics Loop." *IEEE transactions on Visualization and Computer Graphics* 19.12 (2013). (10 pages, in English).

Levieux, Philippe, et al. "Interactive Viewpoint Video Textures." *Proceedings of the 9th European Conference on Visual Media Production.* ACM, 2012. (8 pages, in English).

Schödl, Arno, et al. "Video Textures." *Proceedings of the 27th Annual Conference on Computer Graphics and Interactive Techniques.* ACM Press/Addison-Wesley Publishing Co., 2000. (10 pages, in English).

Stanton, Matt, et al. "Self-Refining Games Using Player Analytics." *ACM Transactions on Graphics (TOG)* 33.4 (2014):73. (10 pages, in English).

* cited by examiner

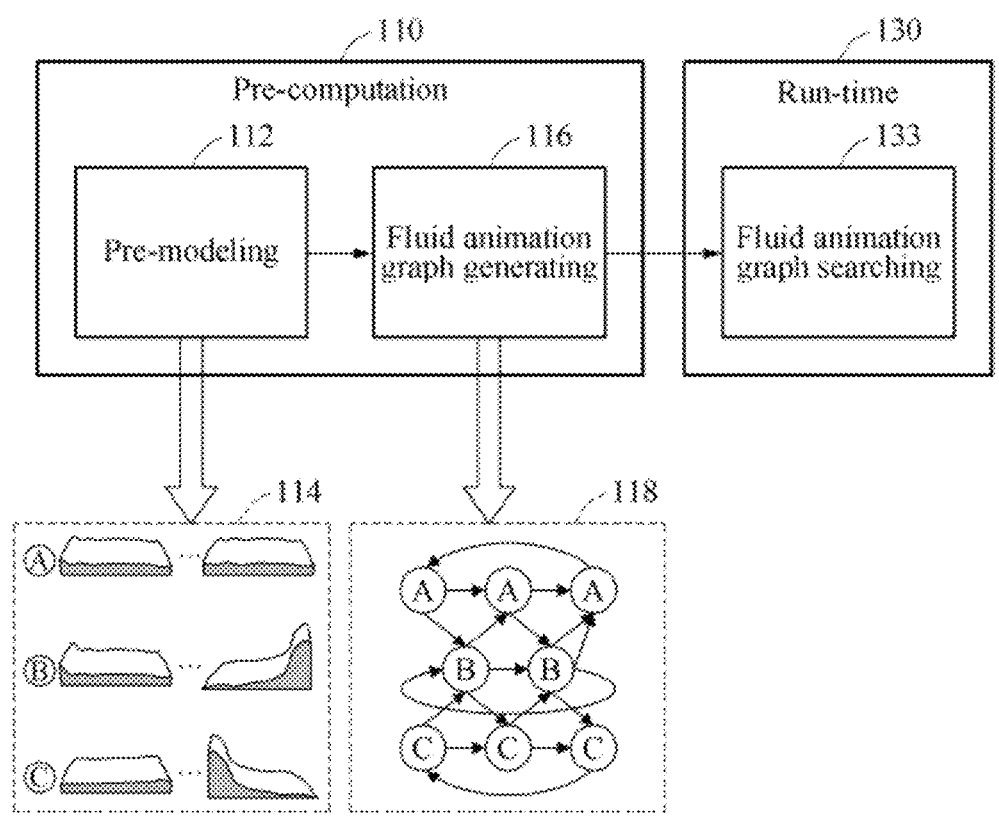

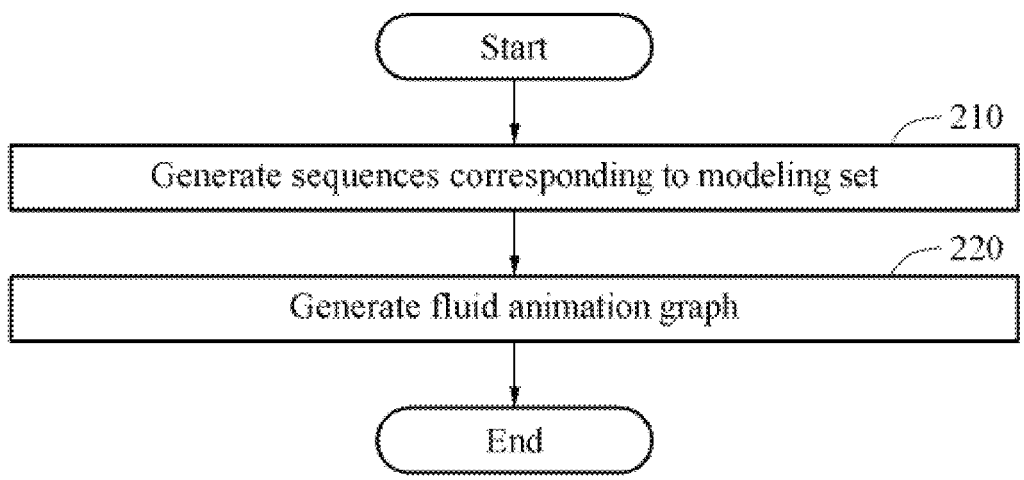
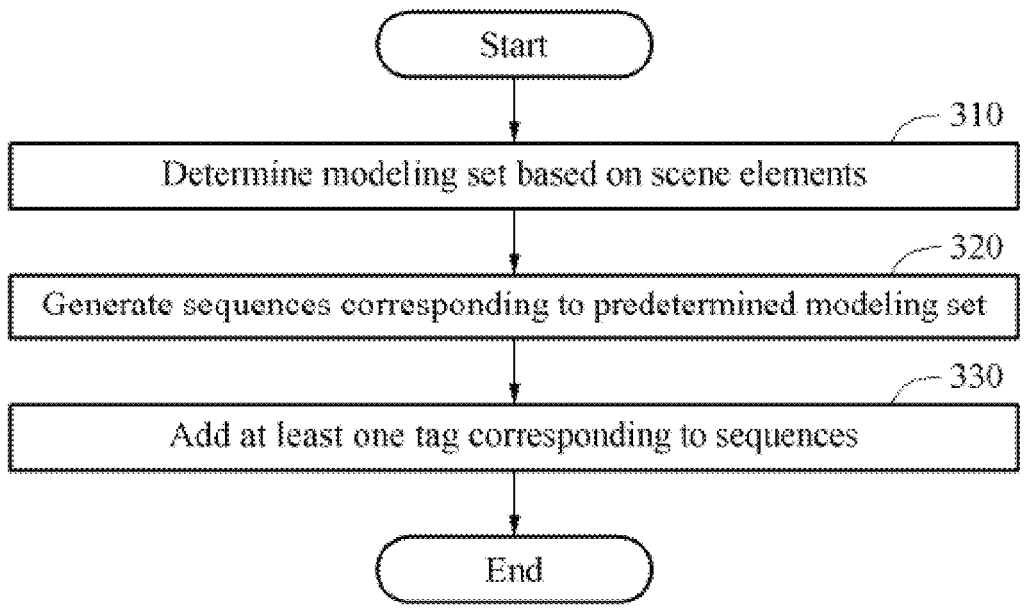

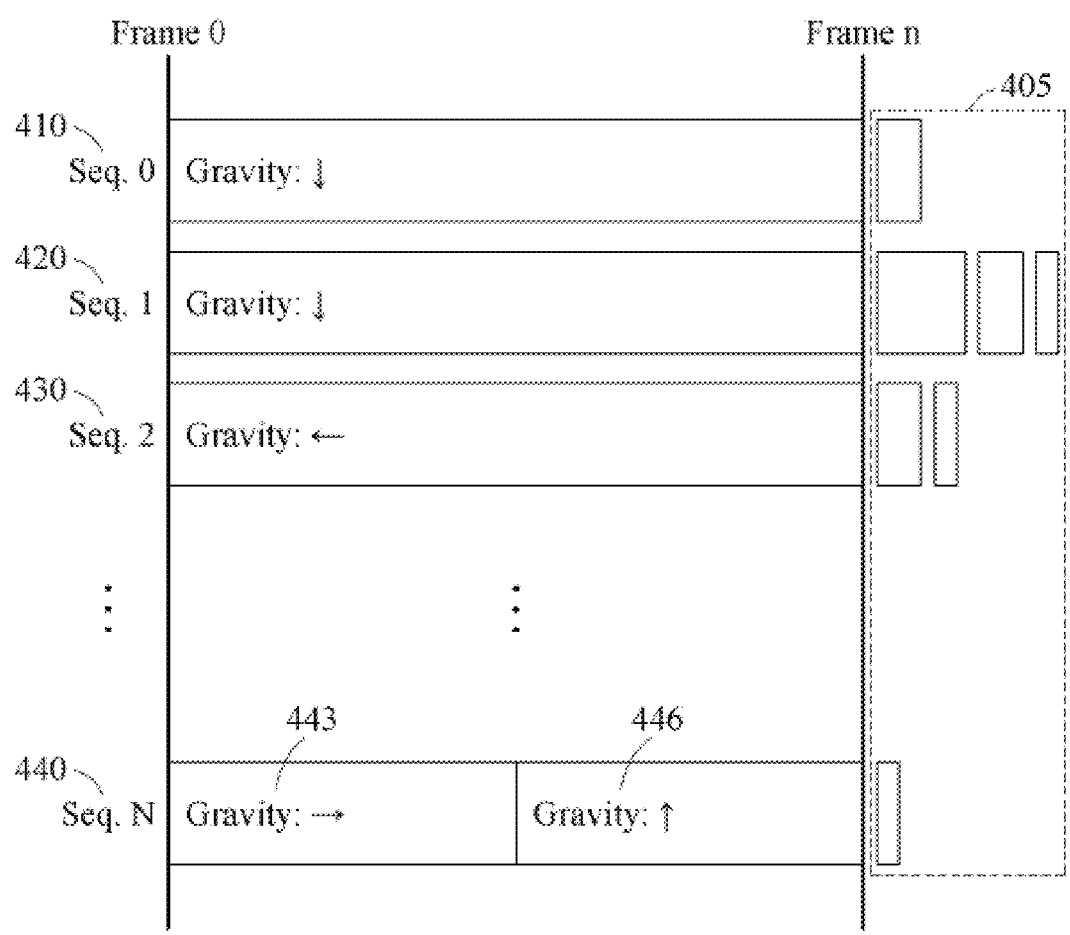

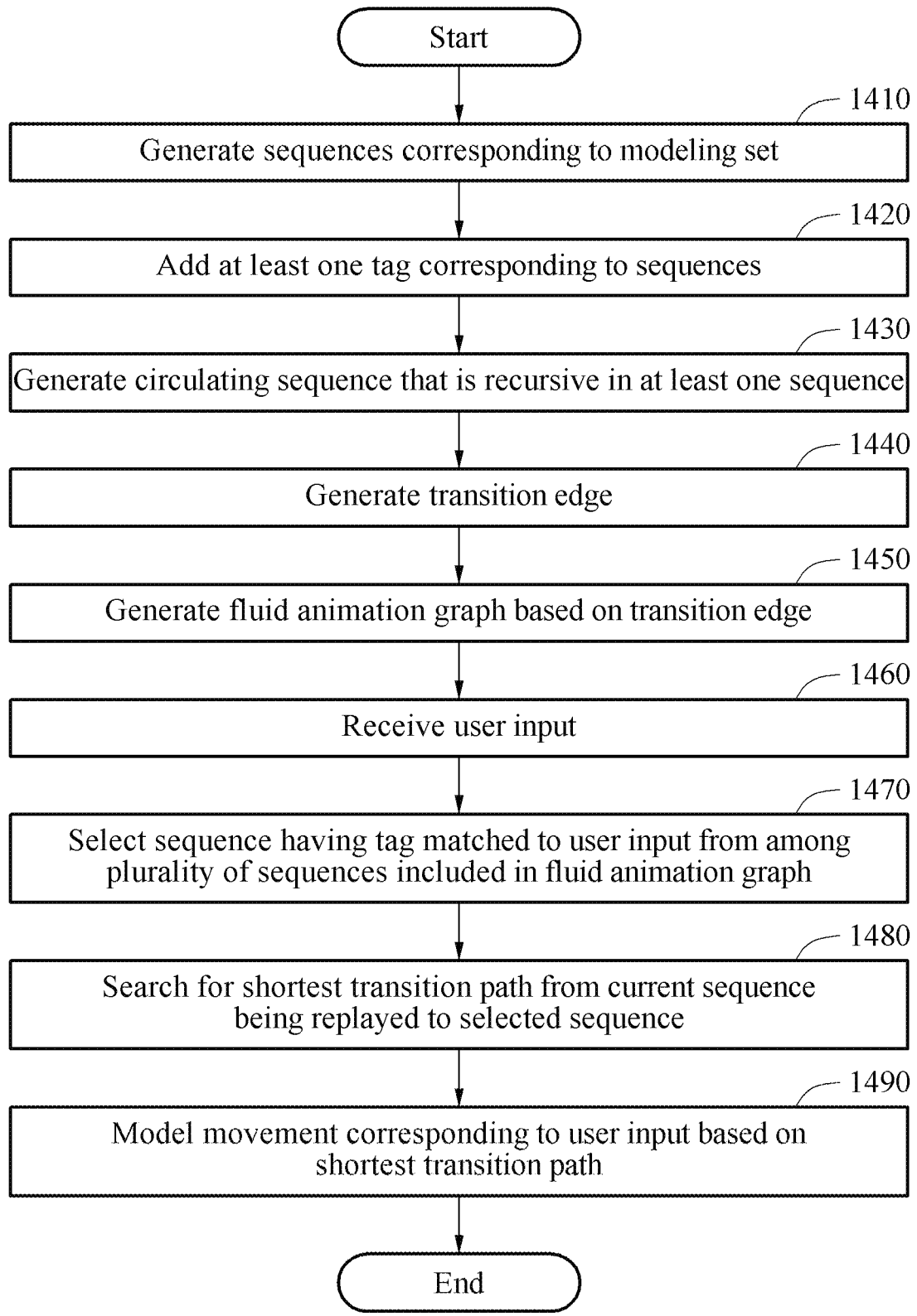

MODELING METHOD AND APPARATUS USING FLUID ANIMATION GRAPH

CROSS-REFERENCE TO RELATED APPLICATIONS

This application claims the benefit under 35 USC 119(a) of Korean Patent Application No. 10-2015-0120663 filed on Aug. 27, 2015 and Korean Patent Application No. 10-2016-0014087 filed on Feb. 4, 2016 in the Korean Intellectual Property Office, the entire disclosures of which are incorporated herein by reference for all purposes.

BACKGROUND

1. Field

The following description relates to a modeling method using a fluid animation graph. The following description also relates to an apparatus using a fluid animation graph.

2. Description of Related Art

In a visual effects (VFX) field of a computer graphics (CG) area, any one of a rigid body, a deformable body, and a fluid, or a combination thereof may be modeled. For example, when a fluid or a combination of a fluid and a deformable body are modeled, a fluid movement modeling method based on a height field may be used. The fluid movement modeling method may be used to perform simple modeling and real-time modeling based on rapid calculations. However, a representation of the fluid may be simplified or a scale of the modeling may be reduced, thereby reducing realism of the model. Therefore, performing real-time modeling while maintaining realism may be difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a modeling method includes searching for a sequence matched to a user input using a fluid animation graph generated based on similarities among frames included in sequences included in the fluid animation graph, and modeling a movement corresponding to the user input based on a result of the searching.

The modeling may include modeling the movement corresponding to the user input by blending sequences similar to the user input from among sequences included in the fluid animation graph in response to the sequence matched to the user input not being retrieved.

The modeling may include blending the sequences similar to the user input based on at least one of velocity information and form information of the sequences included in the fluid animation graph.

The modeling may include searching for retrieved sequences similar to the user input from among the sequences included in the fluid animation graph, generating a blending sequence corresponding to the user input by blending the retrieved sequences, and modeling the movement corresponding to the user input using the blending sequence.

The searching for the retrieved sequences similar to the user input may include searching for the retrieved sequences similar to the user input based on a tag added to the sequences included in the fluid animation graph.

The generating of the blending sequence may include extracting a blending weight based on the retrieved sequences and the user input, and generating the blending sequence by assigning the blending weight to the retrieved sequences.

The generating of the blending sequence may include generating similar transition edges between the blending sequence and the retrieved sequences based on a transition edge between the retrieved sequences.

The modeling may include replaying frames included in the retrieved sequences, verifying that a current frame being replayed corresponds to a frame transition from at least one of the retrieved sequences to the blending sequence, and replaying frames included in the blending sequence based on the similar transition edges between the blending sequence and the retrieved sequences.

The generating of the blending sequence may include generating the blending sequence during a transition based on a transition edge between the retrieved sequences.

The modeling may include replaying the retrieved sequence in response to the sequence matched to the user input being retrieved, wherein the retrieved sequence includes consecutive frames that represent a movement of a deformable body corresponding to the user input and a movement of a fluid due to the movement of the deformable body.

The searching may include selecting a sequence having a tag matched to the user input from among the sequences included in the fluid animation graph, and searching for a transition path from a current sequence being replayed to the selected sequence.

The searching may include determining a direction in which a deformable body is controlled based on the user input, selecting a sequence corresponding to the direction from among the sequences included in the fluid animation graph, and searching for a transition path from a current sequence being replayed to the selected sequence.

The fluid animation graph may be configured to control a movement of a deformable body and includes sequences corresponding to scenarios reflecting a movement of a fluid due to the movement of the deformable body.

The fluid animation graph may include at least one of a circulating sequence generated based on first similarities among frames included in at least one sequence from among the sequences included in the fluid animation graph, the circulating sequence being recursive in the at least one sequence, and a transition edge generated based on second similarities between the frames included in the at least one sequence from among the sequences included in the fluid animation graph and frames included in remaining sequences of the sequences included in the fluid animation graph, the transition edge indicating a possible moving path between the sequences.

The modeling may include replaying frames in a current sequence, verifying that a current frame being replayed corresponds to a frame transitioning from the current sequence to the sequence matched to the user input, and replaying frames in the sequence matched to the user input based on a transition edge to transition between the current sequence and the sequence matched to the user input.

The replaying of the frames in the current sequence may include recursively replaying a circulating sequence in the current sequence.

The replaying of the frames in the sequence matched to the user input may include recursively replaying a circulating sequence in the sequence matched to the user input until an additional user input is received.

The user input may be input by an input device combined with or interconnected with a user apparatus.

In another general aspect a preprocessing method for modeling includes generating sequences corresponding to a predetermined modeling set, wherein each of the sequences includes frames, and generating a fluid animation graph based on similarities among the frames included in the sequences.

The similarities may include at least one of a form similarity, an energy similarity, and a frame similarity.

The generating of the fluid animation graph may include calculating at least one similarity between the frames included in the sequences, assigning a weight to the at least one similarity, and generating the fluid animation graph based on a weighted sum of the at least one similarity to which the weight is assigned.

The generating of the fluid animation graph may include calculating first similarities among frames included in at least one sequence among the sequences, and generating a circulating sequence that is recursive in the at least one sequence based on the first similarities.

The generating of the fluid animation graph includes generating a transition edge indicating a possible moving path from among the sequences based on second similarities between frames included in at least one sequence from among the sequences and frames included in remaining sequences, and generating the fluid animation graph based on the transition edge.

The generating of the transition edge may include calculating the second similarities between the frames included in the at least one sequence from among the sequences and the frames included in the remaining sequences, and generating the transition edge from among frames of which the second similarities correspond to a preset reference.

The generating of the fluid animation graph may include analyzing a motion energy of each frame included in at least one sequence from among the sequences, and setting a transition point in time for each of the sequences based on the motion energy.

The generating of the sequences further includes adding a tag corresponding to the sequences.

The tag may be defined based on at least one of a user input, an external force, an inflow and disappearance of a fluid, and an interaction with another object.

The sequences may include frames representing different scenes.

The sequences may include sub-sequences.

The method may further include determining the modeling set based on predetermined scene elements.

In another general aspect, a non-transitory computer-readable storage medium stores instructions for causing processor processor/computer to perform the first method described above.

In another general aspect, a modeling apparatus includes a memory configured to store sequences corresponding to a modeling set, wherein each of the sequences includes frames, and a fluid animation graph pre-generated based on similarities among the frames included in the sequences included in the fluid animation graph, and a processor configured to search for a sequence matched to a user input based on the fluid animation graph and model a movement corresponding to the user input based on a result of the searching.

The processor may be configured to model the movement corresponding to the user input by blending sequences similar to the user input from among the sequences included in the fluid animation graph in response to the sequence matched to the user input not being retrieved.

The processor may be configured to blend the sequences similar to the user input based on at least one of velocity information and form information of the sequences included in the fluid animation graph.

The processor may be configured to search for retrieved sequences similar to the user input from among the sequences included in the fluid animation graph, generate a blending sequence corresponding to the user input by blending the retrieved sequences, and model the movement corresponding to the user input using the blending sequence.

The processor may be configured to search for the retrieved sequences similar to the user input based on a tag added to the sequences included in the fluid animation graph.

The processor may be configured to extract a blending weight based on the retrieved sequences and the user input, and generate the blending sequence by assigning the blending weight to the retrieved sequences.

The processor may be configured to generate similar transition edges between the blending sequence and the retrieved sequences based on a transition edge between the retrieved sequences.

The processor may be configured to replay frames included in the retrieved sequences, verify whether a current frame being replayed corresponds to a frame transitioning from at least one of the retrieved sequences to the blending sequence, and replay frames included in the blending sequence based on the similar transition edges to transition between the retrieved sequences and the blending sequence.

The processor may be configured to replay the retrieved sequence in response to the sequence matched to the user input being retrieved and the retrieved sequence includes consecutive frames that represent a movement of a deformable body corresponding to the user input and a movement of a fluid due to the movement of the deformable body.

The processor may be configured to select a sequence having a tag matched to the user input from among the sequences included in the fluid animation graph and search for a transition path from a current sequence being replayed to the selected sequence.

The processor may be configured to determine a direction in which a deformable body is controlled based on the user input, select a sequence corresponding to the direction from among the sequences included in the fluid animation graph, and search for a transition path from a current sequence being replayed to the selected sequence.

The apparatus may further include a preprocessor configured to generate the sequences corresponding to the modeling set and generate the fluid animation graph based on the similarities among the frames included in the sequences.

The preprocessor may be configured to calculate at least one similarity between the frames included in the sequences, assign a weight to the at least one similarity, and generate the fluid animation graph based on a weighted sum of the at least one similarity to which the weight is assigned.

The fluid animation graph may be configured to control a movement of a deformable body and includes sequences corresponding to scenarios reflecting a movement of a fluid due to the movement of the deformable body.

In another general aspect, a modeling method includes searching for a fluid animation graph stored in a database, in response to a user input received, determining whether a retrieved sequence matched to the user input is retrieved from among sequences included in the fluid animation graph, in response to the determining indicating that the retrieved sequence matched to the user input is retrieved, fusing detailed modeling elements in the retrieved sequence into a fused sequence, and in response to the determining indicating that the sequence matched to the user input is not retrieved, blending sequences similar to the user among the sequence included in the fluid animation graph and fusing detailed modeling elements in the blending sequences into the fused sequence.

The blending may include form blending performed at a high resolution.

The blending may include velocity blending performed at a low resolution.

The method may further include replaying the fused sequence.

Other features and aspects will be apparent from the following detailed description, the drawings, and the claims.

BRIEF DESCRIPTION OF THE DRAWINGS

FIG. 1 is a diagram illustrating an example of a modeling process in accordance with an embodiment.

FIG. 2 is a flowchart illustrating an example of a pre-computation process in accordance with an embodiment.

FIG. 3 is a flowchart illustrating an example of pre-modeling process in accordance with an embodiment.

FIG. 4 illustrates an example of sequences generated in a pre-modeling process in accordance with an embodiment.

FIG. 14 is a flowchart illustrating an example of a modeling method in accordance with an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 5:
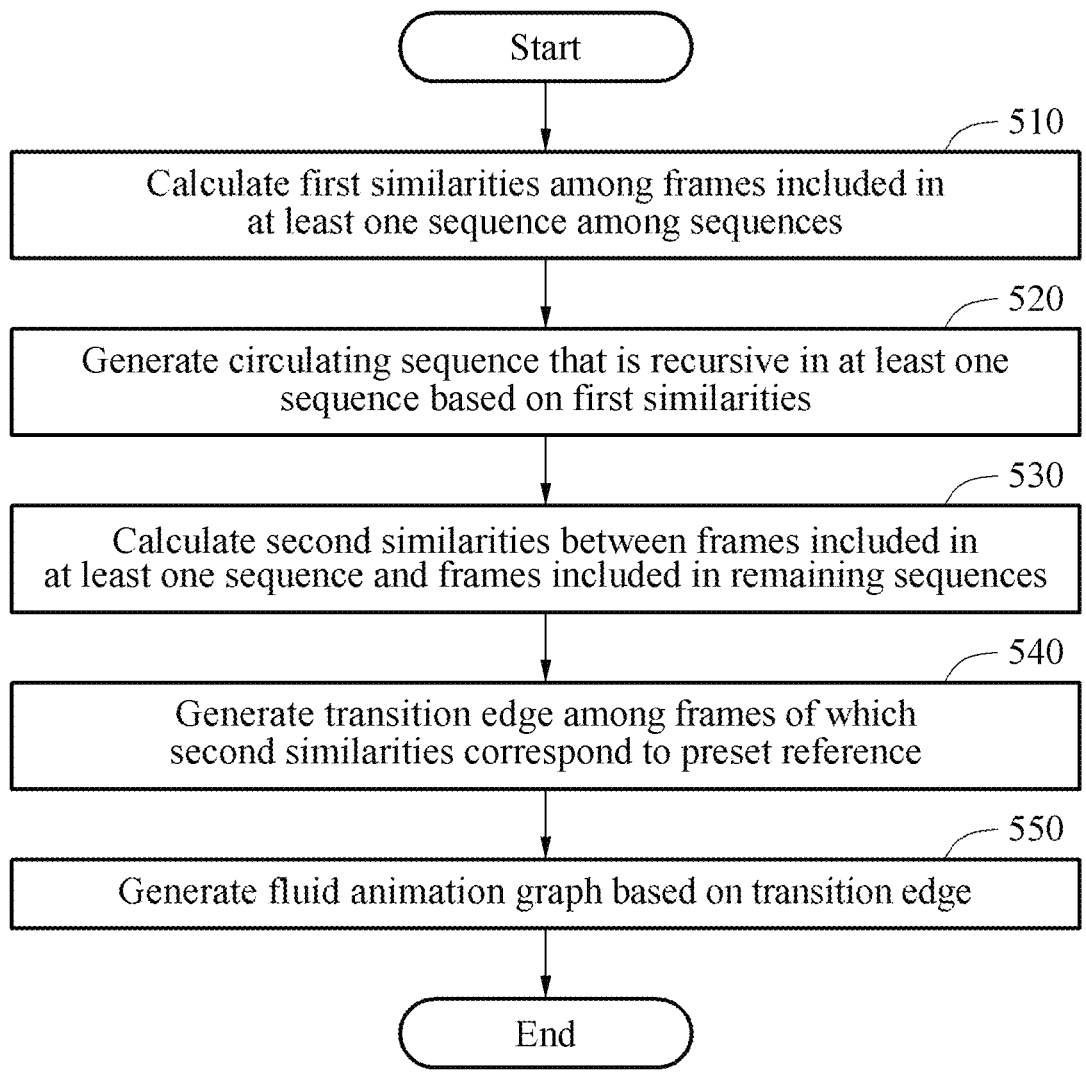
FIG. 5 is a flowchart illustrating an example of a fluid animation graph generating process in accordance with an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, the examples are described with reference to the accompanying drawings. Like reference numerals refer to like elements throughout.

Various alterations and modifications may be made to the examples. Here, the examples are not to be construed as being limited to the disclosure and are to be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It is to be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It is to be further understood that terms, such as those defined in commonly-used dictionaries, are to be interpreted as having a meaning that is consistent with their meaning in the context of the relevant art and are not to be interpreted in an idealized or overly formal sense unless expressly so defined herein.

When describing the examples with reference to the accompanying drawings, like reference numerals refer to like constituent elements and a repeated description related thereto is omitted for brevity. When it is determined that a detailed description related to a related known function or configuration may make the purpose of the examples unnecessarily ambiguous in describing the examples, the detailed description is omitted here for clarity.

FIG. 1 is a diagram illustrating an example of a modeling process in accordance with an embodiment. Referring to the example of FIG. 1, a modeling apparatus may model a movement corresponding to a user input based on a pre-computation process 110 and a run-time processing process 130.

For example, the pre-computation process 110 may be understood as a process of generating a sequence corresponding to a modeling set required for processing a user input and pre-generating sequences connectable to each other, for example, in a form of a fluid animation graph, for modeling a natural movement transition in response to the user input. For example, the pre-computation process 110 may be performed using a geometric form of a fluid and a deformation body based on particles.

The run-time processing process 130 may be understood as a process of modeling a movement corresponding to a user input received in real time using a fluid animation graph 118 generated in the pre-computation process 110.

Figure 20:
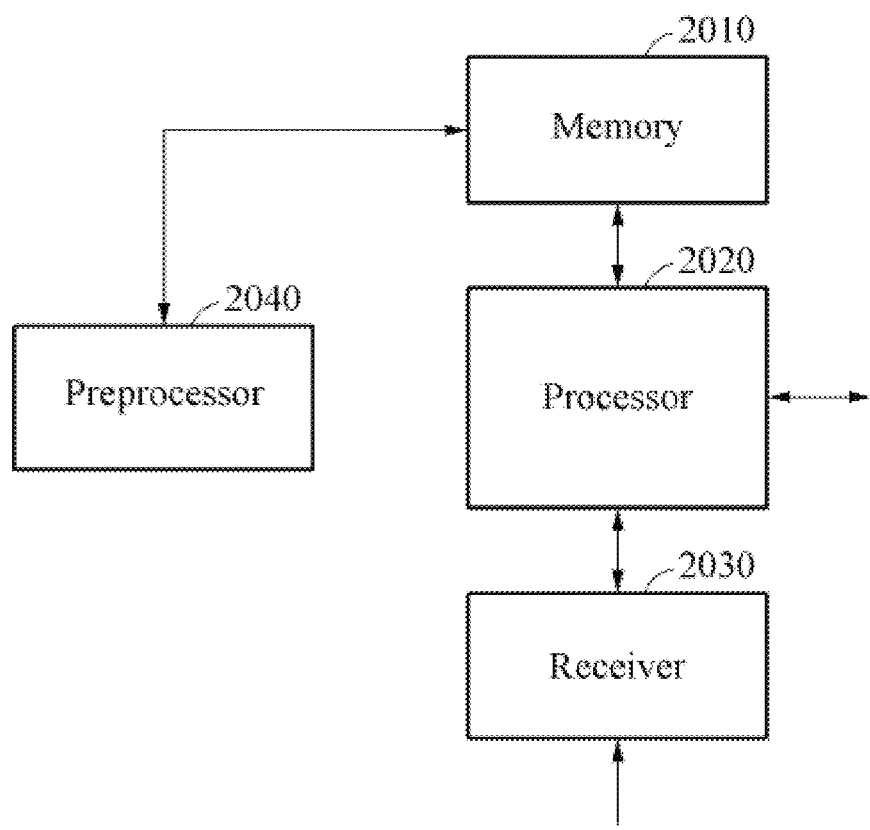
FIG. 20 is a block diagram illustrating an example of a modeling apparatus in accordance with an embodiment.

For example, the pre-computation process 110 may be performed in an additional preprocessor or a preprocessor 2040 as shown in FIG. 20 of the modeling apparatus. Also, in an example, the pre-computation process 110 may be performed in advance and stored in a memory off-line. For example, the run-time processing process 130 may be performed in a processor 2020 as shown in FIG. 20 of the modeling apparatus.

In the example of FIG. 1, the pre-computation process 110 is performed in an order of a pre-modeling process 112 and a fluid animation graph generating process 116.

For example, in the pre-modeling process 112, the modeling apparatus may generate sequence(s) 114 corresponding to the modeling set. For example, the modeling set may be understood as a set of significant animations or image sequences, such as an image of two seconds in which a boat rotates in a right direction in rough seas. For example, the significant image sequences and the animations may correspond to an amount of time greater than or equal to a predetermined time. The term "sequence," as used in the present disclosure, may be understood as a plurality of image frames or animations. In an example, the plurality of image frames or the animations may be consecutive. The sequences 114 include a plurality of frames representing different scenes. For example, a sequence A may include a plurality of frames representing a scene corresponding to calm seas, a sequence B may include a plurality of frames representing a scene corresponding to seas of which a right surface gradually rises. A sequence C may include a plurality of frames representing a scene corresponding to seas of which a left surface gradually rises.

Thus, the modeling set includes a plurality of modeling scenarios. A modeling scenario refers to a scenario that defines an environment and an object to be modeled. For example, each of the modeling scenarios may correspond to at least one scene element. Each of the "scene elements" may be understood as frames required for configuration of at least a portion of the modeling scenario. For example, the frames include image frames, acoustic frames, special effect frames, or various combinations thereof. However, these are only examples and other information is possibly stored in addition to or instead of these examples as frame data. Each of the "scene elements" includes image frames that show a significant scene. For example, the scene elements may include a scene in which a boat floats on the sea or may include a scene in which an airplane flies in a typhoon. The scene elements include images or frames representing different movements. For example, a number of scenarios included in the modeling set may be determined in advance.

In the example of FIG. 1, the modeling apparatus may add at least one tag corresponding to each of the sequences 114. In this example, the term "tag" is understood to be an annotation or an explanation indicating a meaning or a description of a scene of a sequence. For example, the tag may be defined based on a user input, an external force, an inflow and disappearance of a fluid, and an interaction with another object. However, these are merely examples and other alternative appropriate approaches to defining the tag are used in other examples.

For example, tags added to each of the sequences 114 may be used for blending the sequences or searching for a sequence matched to the user input in the run-time processing process 130.

In the example fluid animation graph generating process 116, the modeling apparatus searches for an optimal frame similar to each of the frames by comparing similarities among frames included in the sequences 114. The modeling apparatus also generates the fluid animation graph 118 that represents whether a transition is allowed between the frames. Thus, an example of the fluid animation graph may be identical to the fluid animation graph 118, FIG. 7, or FIG. 14. However, these are only examples, and other appropriate examples are also possible as fluid animation graphs.

In the example of FIG. 1, the fluid animation graph 118 may control a movement of a deformable body and include a plurality of sequences corresponding to a plurality of scenarios reflecting a movement of a fluid due to the movement of the deformable body. In such an example, the deformable body may be understood to include a rigid body and a soft body. For example, the similarities include a form similarity, an energy similarity and a frame similarity. In this example, the frame similarity refers to a similarity between consecutive frames included in a sequence and may be obtained from considering the form similarity and/or the energy similarity of each frame. In this example, the frame similarity may be obtained based on a result of comparing the energy similarity to the form similarity on a frame-by-frame basis in each sequence. For example, it is assumed that a sequence A is provided in 100 frames and a sequence B is provided in 100 frames. In this example, the frame similarity may be calculated for all possible pairings of frames from the sequences. For example, the frame similarity may be calculated for 10000 pairs, based on 100 frames included in the sequence A and 100 frames included in the sequence B. The fluid animation graph 118 may be understood to be a table or a graph indicating a movement in at least one sequence or possible moving connection relationships between different sequences.

For example, the modeling apparatus may generate a circulating sequence that is recursive in at least one sequence, based on the similarities between the frames included in the at least one sequence from among the sequences. Hereinafter, the similarities between the frames included in the at least one sequence are referred to as first similarities. For example, a scene of consecutive ocean waves may be modeled by a circulating sequence that is recursive in the at least one sequence.

For example, the modeling apparatus may generate a transition edge that indicates a possible moving path among the sequences by comparing similarities between frames included in different sequences. Hereinafter, similarities between the frames included in the at least one sequence among the different sequences and frames included in remaining sequences, excluding the at least one sequence, are referred to as second similarities.

In the example of FIG. 1, in the run-time processing process 130, the modeling apparatus models the movement corresponding to the user input by searching the fluid animation graph 118 using a fluid animation graph searching process 133. When the user input is received during the run-time processing process 130, the modeling apparatus models the movement corresponding to the user input by searching for the sequence matched to the user input, using the fluid animation graph 118. For example, the user input may be input by an input device combined with or interconnected to a user apparatus, for example, a user terminal, a joystick, and a head-mounted display (HMD). However, these are only examples, and other sources of user input are used in other examples, appropriately. For example, the user input is provided for controlling a movement of a moving boat on water.

FIG. 2 is a flowchart illustrating an example of a pre-computation process in accordance with an embodiment. Referring to the example of FIG. 2, the process generates sequences corresponding to a predetermined modeling set in operation 210. For example, a modeling apparatus or a preprocessor generates sequences corresponding to a predetermined modeling set in operation 210. These sequences include a plurality of frames. In the example of FIG. 2, a process of generating the sequences by the modeling apparatus may correspond to the pre-modeling process 113 of the pre-computation process 110. The method of generating the sequences by the modeling apparatus is described in further detail with reference to FIGS. 3 and 4.

In operation 220, the process generates a fluid animation graph based on similarities among frames included in sequences. For example, the modeling apparatus generates a fluid animation graph based on similarities among frames included in sequences. In the example of FIG. 2, a process of generating the fluid animation graph by the modeling apparatus may correspond to the fluid animation graph generating process 116 of the pre-computation process 110. The method of generating the fluid animation graph by the modeling apparatus is described in further detail with reference to FIGS. 5 through 7. For example, the modeling apparatus may compare the similarities among the frames by comparing the frames included in the sequences on a frame-by-frame basis. The method of comparing the similarities among the frames by the modeling apparatus is described in further detail with reference to FIGS. 8 and 9.

FIG. 3 is a flowchart illustrating an example of pre-modeling process in accordance with an embodiment. Referring to the example of FIG. 3, in operation 310, the process determines a modeling set based on scene elements. For example, a modeling apparatus determines a modeling set based on scene elements in operation 310. In such an example, the modeling apparatus determines a modeling set that represents different movements in various circumstances. The modeling apparatus may set a modeling set with respect to a force, for example, gravity, a user external force, an interaction force by a fluid, and an elastic force, applied to an object, for example, a boat and water, to be modeled. However, these are only examples of forces, and other appropriate forces are modeled in other examples. In this example, when the modeling apparatus is combined or interconnected to an HMD, an external force applied to an object may be controlled in response to a head movement of a user. Also, a movement of an object may be controlled to correspond to control information, for example, a direction, a size, and an angle of a force, to correspond to input received from a joystick. Thus, the modeling apparatus may provide a virtual reality or an augmented reality experience based on the foregoing method.

In an example, a number of modeling scenarios included in the modeling set may be determined in advance, such as by being based on a setting of the modeling apparatus or a selection of the user. When the number of the modeling scenarios included in the modeling set is relatively large, the modeling apparatus may represent a movement corresponding to the user input in a more detailed and natural manner by providing more information to help represent the movement more accurately.

In operation 320, the process generates sequences corresponding to a predetermined modeling set. For example, the modeling apparatus generates sequences corresponding to a predetermined modeling set. For example, the modeling apparatus may generate sequences as illustrated in the example of FIG. 4.

In operation 330, the process adds at least one tag corresponding to the sequences. For example, the modeling apparatus adds at least one tag corresponding to the sequences. For example, the tag may be represented based on information on an annotation or a meaning of a sequence, identification information associated with a sequence, and a combination of the aforementioned information. However, these are only examples and tags include other appropriate types of information that are associated with a sequence that is useful when managing sequences.

FIG. 4 illustrates an example of sequences generated in a pre-modeling process in accordance with an embodiment. Referring to FIG. 4, N sequences 410, 420, 430, and 440 that are generated by a modeling apparatus are illustrated. The sequences 410, 420, 430, and 440 include n+1 frames, including frames from a frame 0 to a frame n, as illustrated in FIG. 4, or also may include frames representing different scenes for each sequence. In this example, a number of the frames representing the different scenes may vary for each sequence.

The sequences 410, 420, 430, and 440 include a tag 405. For example, a single tag may be added for each sequence, or a plurality of tags may be added for each sequence.

As discussed above, the tag 405 includes an annotation or a meaning associated with a sequence. For example, a tag may identify an image in which a boat makes a right turn in rough seas for four seconds, of a corresponding sequence.

In such an example, contents of the tag 405 may directly correspond to a user input, for example, a rotation, a stop, and acceleration. The contents of the tag 405 may be defined by various methods. For example, the tag contents may be associated with information such as various forces, such as, for example, gravity, an impact energy, and a kinetic energy, applied by a movement corresponding to the user input, an inflow and disappearance of a fluid or gas due to the movement corresponding to the user input in a space to be modeled, and an interaction of another object with the movement corresponding to the user input. However, these are only examples of information associated with the tags and in other examples the tags correspond to other information.

A sequence, for example, the sequence 440, includes a plurality of sub-sequences. For example, the sequence 440 includes a sub-sequence 443 that represents a movement of a boat when gravity is applied in a rightward direction and a sub-sequence 446 that represents a movement of the boat when gravity is applied in a direction from bottom to top.

Also, a plurality of sub-sequences includes a plurality of tags. In such an example, a sequence may include a tag indicating a meaning for each portion of an interval, for example, a sub-sequence, that is included in a single sequence.

FIG. 5 is a flowchart illustrating an example of a fluid animation graph generating process in accordance with an embodiment. Referring to FIG. 5, the process calculates first similarities among frames included in at least one sequence among sequences in operation 510. For example, a modeling apparatus calculates first similarities among frames included in at least one sequence among sequences in operation 510. In operation 520, the process generates a circulating sequence that is recursive in the at least one sequence based on the first similarities. For example, the modeling apparatus generates a circulating sequence that is recursive in the at least one sequence based on the first similarities.

In an example, it is assumed that ten frames are included in a sequence B from among a plurality of sequences A, B, C, and D. The modeling apparatus may calculate similarities, for example, the first similarities, between a first frame and nine remaining frames from among the ten frames included in the sequence B. The modeling apparatus may search for an optimal transition allowing the sequence B to be iteratively performed by comparing the similarities between the first frame and the nine remaining frames on a frame by frame basis. The modeling apparatus may generate a circulating sequence that is recursive in the sequence B based on the optimal transition, as determined by the modeling apparatus. The method of generating the circulating sequence by the modeling apparatus is described further with reference to FIG. 6.

In operation 530, the process calculates second similarities between frames included in the at least one sequence and frames included in remaining sequences. For example, the modeling apparatus calculates second similarities between frames included in the at least one sequence and frames included in remaining sequences. In operation 540, the process generates a transition edge among frames of which the second similarities correspond to a preset reference. For example, the modeling apparatus generates a transition edge among frames of which the second similarities correspond to a preset reference.

In an example, it is assumed that, among the plurality of sequences A, B, C, and D, the sequence A includes eight frames, the sequence B includes ten frames, the sequence C includes nine frames, and the sequence D includes ten frames.

In such an example, the modeling apparatus may calculate similarities, for example, the second similarities, between the eight frames included in the sequence A and the frames included in each of the sequences B, C, and D. For example, the second similarities each have a value from 0 to 1. When frames are identical, a second similarity may have a value of 1. When the frames are different, the second similarity may have a value of 0. Also, the second similarity may have a value between 0 and 1, where the greater the value, the greater the degree of similarity between the frames. For example, the modeling apparatus may connect the transition edge between frames whose second similarities are greater than a preset reference value, for example, 0.85, among second similarities of frames included in sequences differing from the eight frames included in the sequence A. Based on the transition edge, a transition among the sequences may be possibly modeled. The transition edge indicates whether an inter-sequence transition among sequences is appropriate. Accordingly, the transition edge may be applied as a moving path among the sequences. The method of comparing the second similarities may be identically applied based on the aforementioned method of comparing the first similarities.

In operation 550, the process generates the fluid animation graph based on the transition edge. For example, a modeling method generates the fluid animation graph based on the transition edge. The method of generating the fluid animation graph by the modeling apparatus based on the transition edge is described in further detail with reference to FIG. 7.

Figure 6:
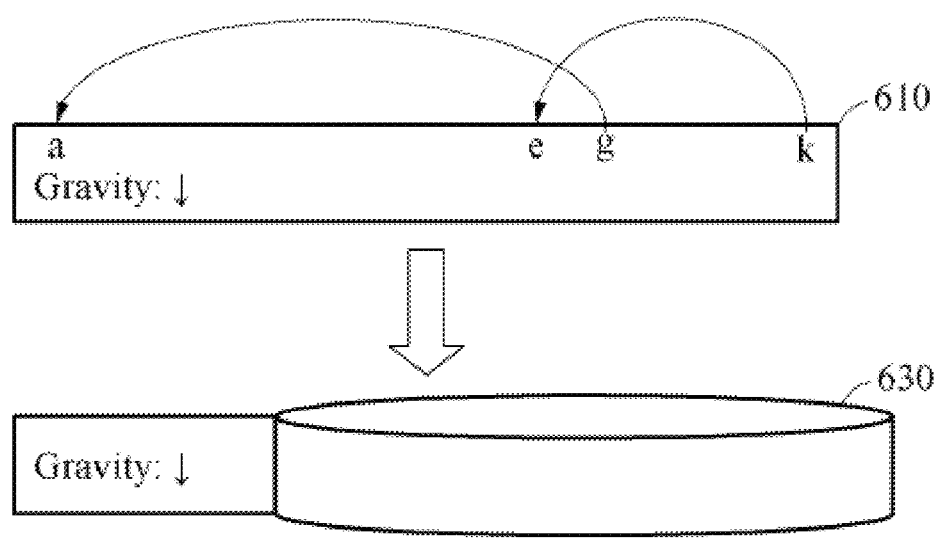
FIG. 6 illustrates an example of a method of generating a circulating sequence in accordance with an embodiment.

FIG. 6 illustrates an example of a method of generating a circulating sequence in accordance with an embodiment. Referring to FIG. 6, a single sequence 610 including a plurality of frames and a recursive circulating sequence 630 are illustrated.

For example, it is assumed that the sequence 610 includes 11 frames identified as a, b, c, d, e, f, g, h, i, j, and k. A modeling apparatus may calculate similarities, for example, first similarities, between any one frame, for example, the frame g, included in the sequence 610 and the ten other frames in the sequence 610.

In response to a result of the calculating, when similarities between the frame g and the frame a and similarities between the frame k and the frame e are greater than a preset reference value, the modeling apparatus may generate a transition edge to be recursive from the frame g to the frame a, or from the frame k to the frame e, in the sequence 610. In this example, in a case of a transition being recursive from the frame g to the frame a, all of the frames included in the sequence 610 may not be replayed and hence an amount of time for performing a sequence may be relatively small.

For example, the modeling apparatus may sufficiently replay the frames included in the sequence 610 and search for an optimal transition allowing a repetitive replay of certain frames. In an example, the modeling apparatus may search for a transition of frames in an order of the frame a→the frame k→the frame e→the frame g≥the frame a.

The modeling apparatus may generate the circulating sequence 630 to be recursive in an order of the frame a→the frame k→the frame e→the frame g→the frame a. A portion of the circulating sequence 630 represented in FIG. 6 as having a cylindrical form indicates that a corresponding sequence refers to a recursive circulating sequence. In an example, the modeling apparatus may model an iterative operation by the circulating sequence 630 until a new user input is received.

Figure 7:
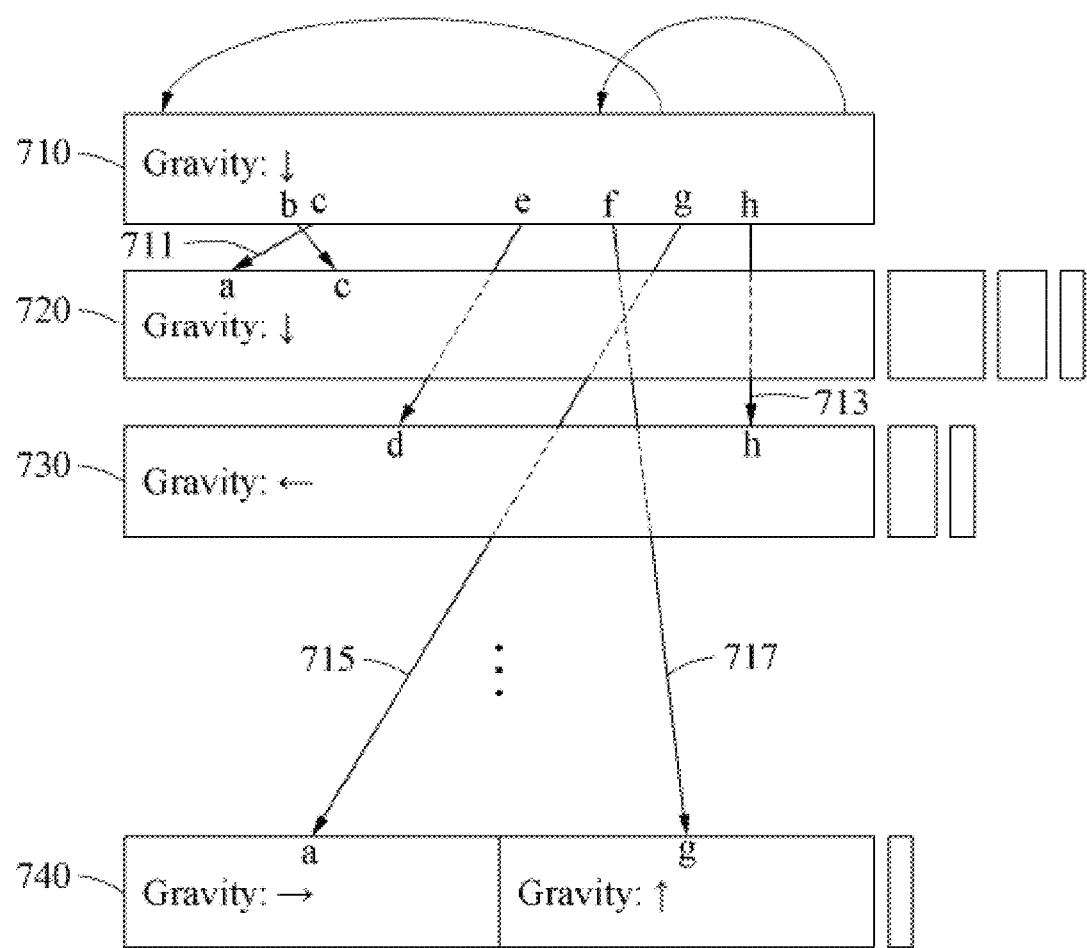
FIG. 7 illustrates an example of a method of generating a fluid animation graph in accordance with an embodiment.

FIG. 7 illustrates an example of a method of generating a fluid animation graph in accordance with an embodiment. FIG. 7 illustrates a fluid animation graph in which sequences of a plurality of sequences 710, 720, 730, and 740 are connected by transition edges 711, 713, 715, and 717.

In an example, the sequence 710 and the sequence 720 are sequences that represent movement of a boat at sea when a force is applied from a direction that is directed from top to bottom, or downwards. In this example, the sequence 710 and the sequence 720 are different sequences having different tag values of which a user input and an applied external force are different, in addition to the force applied from top to bottom. The sequence 730 is a sequence representing a movement of the boat when the force is applied from a right to left direction, and the sequence 740 is a sequence representing a movement of the boat when the force is applied in a direction from the left to the right and then to the top. For example, the sequence 740 includes a first sub-sequence representing the movement of the boat when the force is applied from right to left and a second sub-sequence representing the movement of the boat when the force is applied from the bottom to the top.

A modeling apparatus may calculate similarities, for example, second similarities, between frames included in at least one sequence of the different sequences 710, 720, 730, and 740 and frames included in remaining sequences. The modeling apparatus may generate transition edges between frames of which the second similarities calculated among the sequences 710, 720, 730, and 740 have a value greater than a preset reference. For example, the preset reference may be 0.9. However, other values for the preset reference are possible and may be chosen for a particular use situation.

Based on the second similarities between the frames included in the different sequences, the modeling apparatus generates the transition edge 711 between a frame c included in the sequence 710 and a frame a included in the sequence 720, and generates the transition edge 713 between a frame h included in the sequence 710 and a frame h included in the sequence 730. The modeling apparatus also generates the transition edge 715 between a frame g included in the sequence 710 and a frame a included in a first sub-sequence of the sequence 740, and generates the transition edge 717 between a frame f included in the sequence 710 and a frame g included in a second sub-sequence of the sequence 740.

In this example, the frames whose second similarities have a value greater than the preset reference are understood as frames representing a movement of which different sequences are naturally related when two similar frames included in different sequences are connected and replayed.

For example, when second similarities between a frame d included in a sequence A representing a boat rotating at an angle of 90 degrees in a rightward direction and a frame f included in a sequence B representing the boat rotating at an angle of 45 degrees in the rightward direction are greater than the preset reference, such as 0.9, the modeling apparatus may generate a first transition edge between the frame d included in the sequence A and the frame f included in the sequence B. When modeling is performed based on the first transition edge in the fluid animation graph, a scene in which the boat rotates at an angle of 90 degrees in the rightward direction and then rotates at an angle of 45 degrees is replayed naturally.

Figure 8:
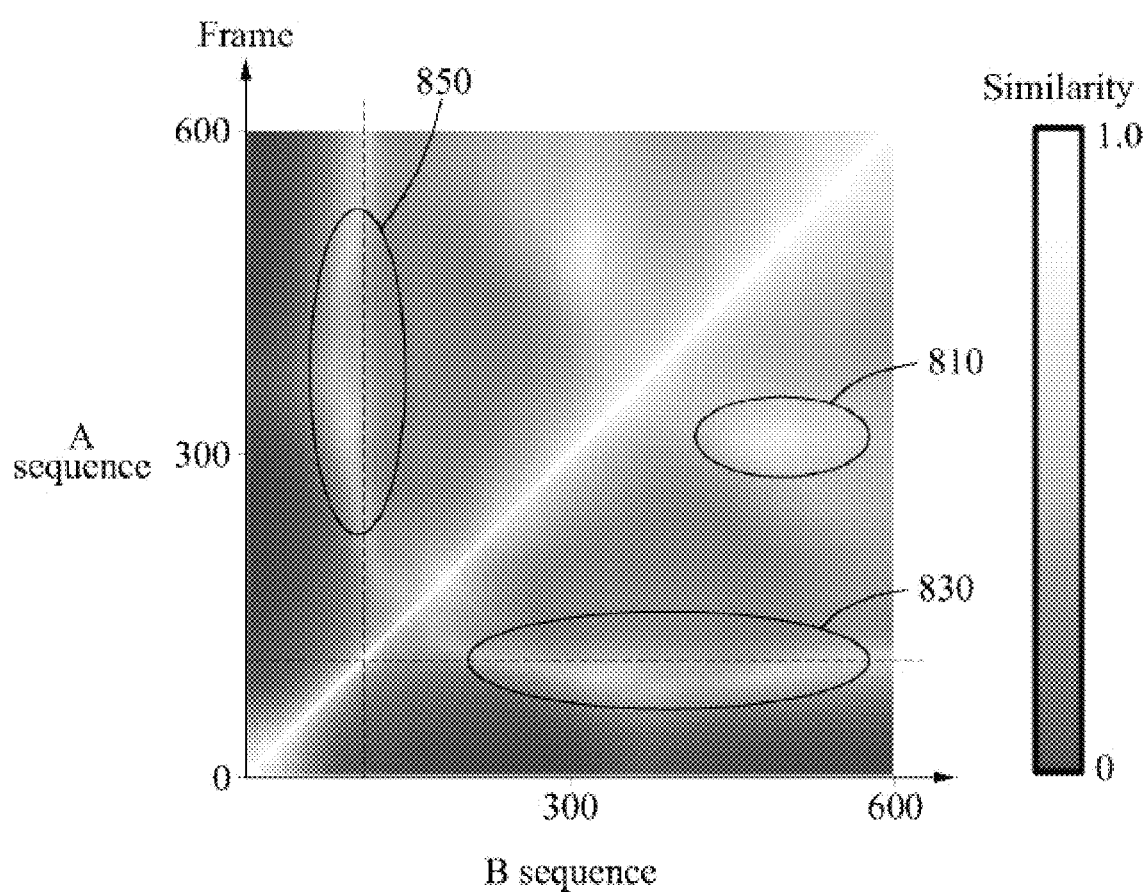
FIG. 8 illustrates an example of a method of comparing similarities among sequences in accordance with an embodiment.

FIG. 8 illustrates an example of a method of comparing similarities among sequences in accordance with an embodiment. Referring to the example of FIG. 8, a graph indicating similarities between a sequence A and a sequence B is illustrated. In this example, it is assumed that the sequence A and the sequence B are identical sequences in which gravity is applied downward and each includes 600 frames, respectively. In the graph, the similarities have a value from 0 to 1. When the similarities are identical, the similarities have a value of 1. When the similarities are completely different, the similarities may have a value of 0. Intermediate values between 0 and 1 indicate a partial level of similarity, with the level of similarity increasing with increasing value.

Referring to FIG. 8, when a portion is represented as white or a light gray, such a portion indicates a portion in which the number of similarities among frames is relatively high, or close to 1. When a portion is represented as black or a dark gray, the portion is understood as being a portion in which the number of similarities among the frames is relatively low.

In an area 810, the number of similarities between a portion corresponding to a frame 500 of the sequence B and a frame 320 of the sequence A is relatively high, and this situation is illustrated because the area 810 has a relatively light shade on the example of FIG. 8. The modeling apparatus may generate a circulating sequence between the frame 500 of the sequence B and the frame 320 of the sequence A, because the area 810 indicates such a relatively high correspondence between these frames. In this example, when the sequence A differs from the sequence B, the modeling apparatus may generate a transition edge between the frame 500 of the sequence B and the frame 320 of the sequence A based on the similarity.

In an area 830, the number of similarities among a portion corresponding to the frame 320 of the sequence B, the portion corresponding to the frame 500, and the frame 100 of the sequence A is relatively high. As a result, the modeling apparatus may generate circulating sequences between the frame 320 of the sequence B and the frame 100 of the sequence A and between the frame 500 of the sequence B and the frame 100 of the sequence A. In this example, when the sequence A differs from the sequence B, the modeling apparatus may generate transition edges between the frame 320 of the sequence B and the frame 100 of the sequence A and between the frame 500 of the sequence B and the frame 100 of the sequence A, based on the similarity.

The modeling apparatus may generate a transition edge with respect to an area 850 based on the aforementioned method used in the area 830, for example, appropriately associating corresponding frames of the sequences A and B.

Figure 9:
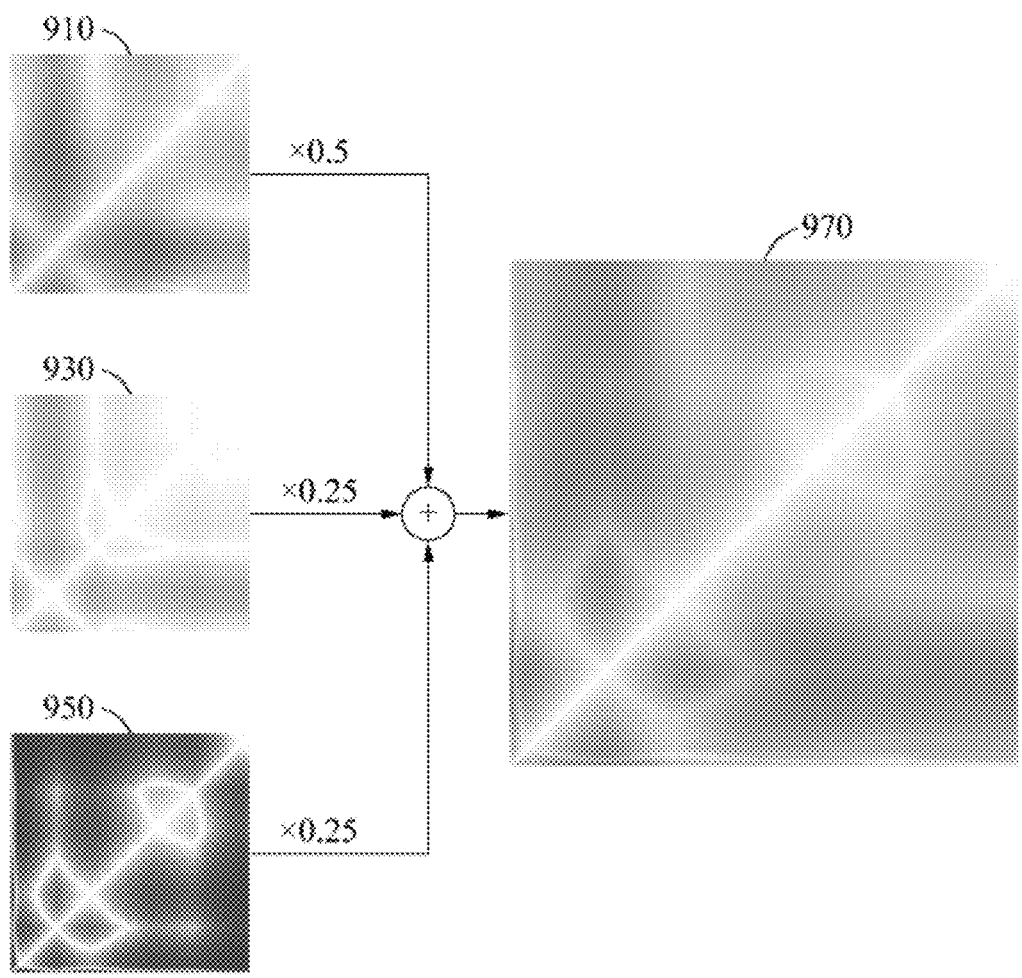
FIG. 9 illustrates an example of generating a fluid animation graph based on similarities in accordance with an embodiment.

FIG. 9 illustrates an example of generating a fluid animation graph based on similarities in accordance with an embodiment. FIG. 9 illustrates graphs 910, 930, and 950 representing various similarities usable for verifying, by a modeling apparatus, similarities among frames and a fluid animation graph 970 generated using various similarities. For example, the graphs illustrated in FIG. 9 are similar to the graph presented in the example of FIG. 8.

The graph 910 represents a form similarity among frames included in sequences, the graph 930 represents a potential energy similarity among the frames, and the graph 950 represents a kinetic energy similarity among the frames. These graphs 910, 930, and 950 are derived by a modeling apparatus based on appropriate analysis of information associated with the frames, as discussed further, below.

When a form of a frame a is compared to a form of a frame b, the modeling apparatus may calculate the form similarities using an area accordance rate, for example, $(a \cap b)/(a \cup b)$. When the frame a and the frame b are pre-modeled based on particles, the modeling apparatus may calculate a position energy or a kinetic energy for each frame based on a total sum of all particle energy.

In an example, the modeling apparatus may assign different weights with respect to each of the similarities. For example, the modeling apparatus may assign a weight of 0.5 to the form similarity, and assign a weight of 0.25 to each of the position energy similarity and the kinetic energy similarity, respectively.

The modeling apparatus may generate the fluid animation graph based on a weighted sum of the similarities to which the weights are assigned, as discussed further, above.

Figure 10:
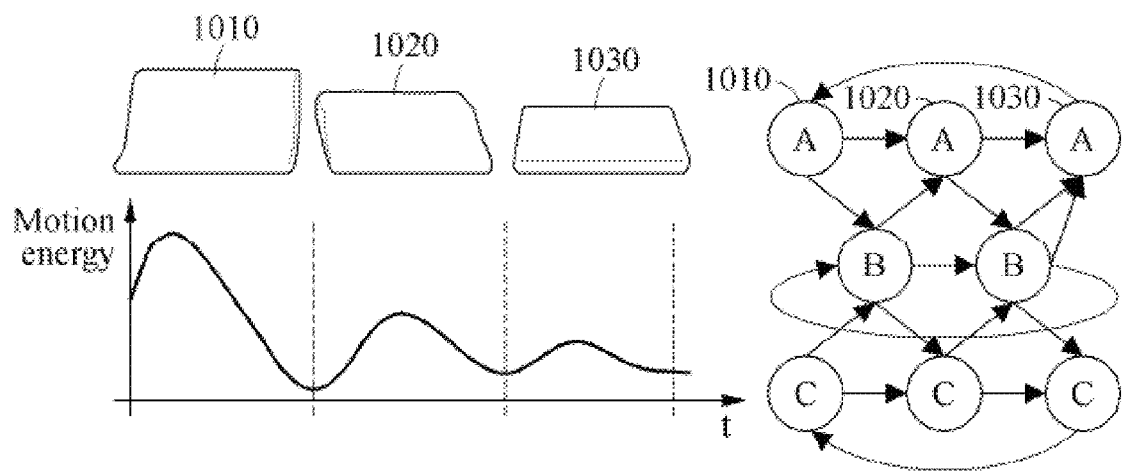
FIG. 10 illustrates an example of a method of setting a transition point in time for each sequence based on a motion energy of each frame included in a sequence in accordance with an embodiment.

FIG. 10 illustrates an example of a method of setting a transition point in time for each sequence based on a motion energy of each frame included in a sequence in accordance with an embodiment. In the example of FIG. 10, a graph indicating different motion energies of a plurality of frames included in a single sequence is illustrated. The motion energies of each frame are understood as a total amount of motions associated with a corresponding frame, that is, a sum of a kinetic energy, a potential energy, an elastic energy, and/or a collision energy. Each frame is associated with a metric that associates it with a total of the energies of these above types of energy that model motion characteristics of the frame.

For example, a frame 1010 among frames included in a sequence A represents a 10-meter wave having a motion energy value of 10, a frame 1020 represents a 6-meter wave having a motion energy value of 6, and a frame 1030 represents a 1-meter wave having a motion energy value of 1. A modeling apparatus may analyze the motion energies of the frames 1010, 1020, and 1030 included in the sequence A and set a transition point in time or a transition point of the sequence A as transitioning to another sequence B based on the motion energies.

During a transition from the sequence A to the sequence B, the modeling apparatus may naturally connect scenes from the sequence A to the sequence B by setting, as a transition point in time, the frame 1020 of which the motion energy is similar to that of the transitioning sequence B from among the frames included in the sequence A when the frames included in the sequence B represent a 4-meter wave having motion energies of 4 and 5. Such a transition is appropriate based on the information processed by the modeling apparatus.

Figure 11:
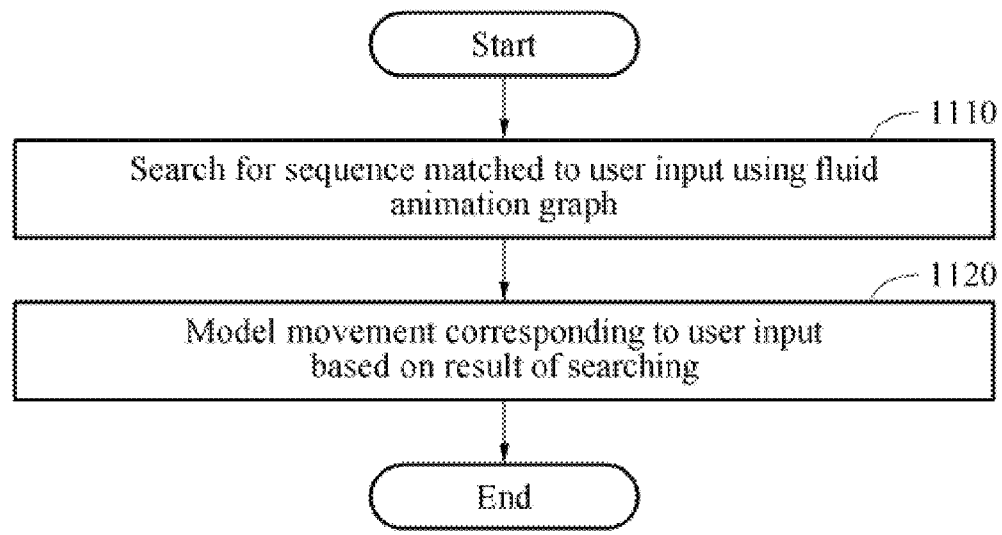
FIG. 11 is a flowchart illustrating an example of a run-time processing process in accordance with an embodiment.

FIG. 11 is a flowchart illustrating an example of a run-time processing process in accordance with an embodiment. Referring to FIG. 11, the process searches for a sequence matched to a user input using a fluid animation graph in operation 1110. For example, a modeling apparatus searches for a sequence matched to a user input using a fluid animation graph in operation 1110. In operation 1110, in an example, the modeling apparatus may determine a direction in which a deformable body is controlled based on the user input and select a sequence corresponding to that direction from among a plurality of sequences included in the fluid animation graph. For example, the modeling apparatus may search for a transition path from a current sequence that is being replayed to the selected sequence. In this example, the fluid animation graph may control a movement of the deformable body and include a plurality of sequences corresponding to a plurality of scenarios reflecting a movement of a fluid due to the movement of the deformable body. Such a fluid animation graph facilitates the operation of the modeling apparatus by providing information about ways the movement of a fluid due to the movement of the deformable body is to be modeled.

For example, the fluid animation graph may be pre-generated and stored in a memory based on the pre-computation process 110 in the example of FIG. 1. Also, the fluid animation graph includes at least one of a circulating sequence generated based on first similarities among frames included in at least one sequence among the sequences and a transition edge generated based on second similarities between the frames included in the at least one sequence among the sequences and frames included in remaining sequences. In this example, the circulating sequence may be recursive in the at least one sequence. The transition edge refers to a possible moving path between the sequences. The method of searching for the sequences by the modeling apparatus is described further with reference to FIGS. 12 and 13A-13B.

In operation 1120, the process models a movement corresponding to the user input based on a result of the searching in operation 1110. For example, the modeling apparatus models a movement corresponding to the user input based on a result of the searching performed in operation 1110. For example, the modeling apparatus may replay the retrieved sequence in response to the sequence matched to the user input being retrieved. In this example, the retrieved sequence may include a plurality of consecutive frames representing the movement of the deformable body corresponding to the user input and the movement of the fluid due to the movement of the deformable body. In response to the retrieval of the sequence matched to the user input, an example of an overall operation from a pre-computation process to a run-time processing process is illustrated in the example of FIG. 14.

In operation 1120, in response to the sequence matched to the user input not being retrieved, the process models a movement corresponding to the user input by blending sequences similar to the user input among a plurality of sequences included in the fluid animation graph. For example, the modeling apparatus models a movement corresponding to the user input by blending sequences similar to the user input from among a plurality of sequences included in the fluid animation graph. A method of blending sequences by the modeling apparatus is described further with reference to FIGS. 16 through 18.

Figure 12:
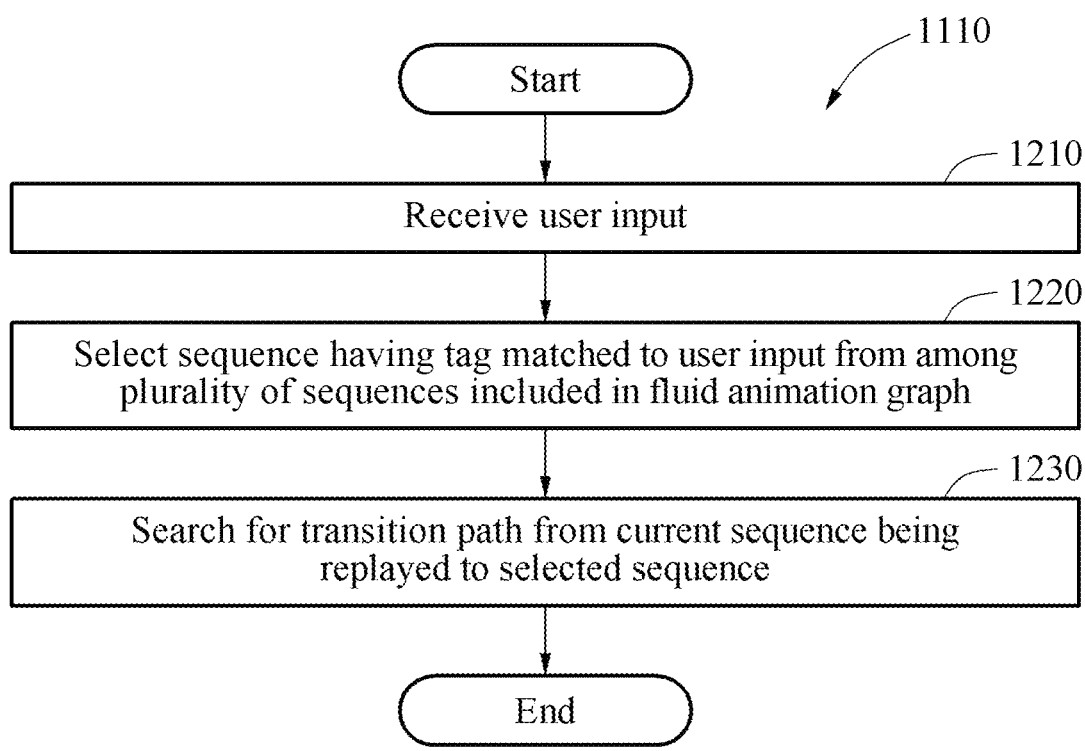
FIG. 12 is a flowchart illustrating an example of a method of searching for a sequence matched to a user input in accordance with an embodiment.

FIG. 12 is a flowchart illustrating an example of a method of searching for a sequence matched to a user input in accordance with an embodiment. Hence, FIG. 12 illustrates a way of performing such a search, which may correspond to operation 1110 as illustrated in FIG. 11. Referring to the example of FIG. 12, the process receives a user input in operation 1210. For example, a modeling apparatus receives a user input, such as in operation 1110.

In operation 1220, the process selects a sequence having a tag matched to the user input from among a plurality of sequences included in a fluid animation graph that are generated in a pre-computation process. For example, the modeling apparatus selects a sequence having a tag matched to the user input from among a plurality of sequences included in a fluid animation graph that are generated in a pre-computation process. In operation 1230, the process searches for a transition path from a current sequence being replayed to the sequence selected in operation 1220. For example, the modeling apparatus may search for a transition path from a current sequence being replayed to the sequence selected in operation 1220. In an example, the modeling apparatus searches for the sequence that has the tag matched to the user input by changing the user input as a display type, for example, by using a pre-arranged binary code or a hexadecimal code. For example, the modeling apparatus may search for the sequence based on a shortest transition path through a transition edge connected to the retrieved sequence.

Figure 13A:
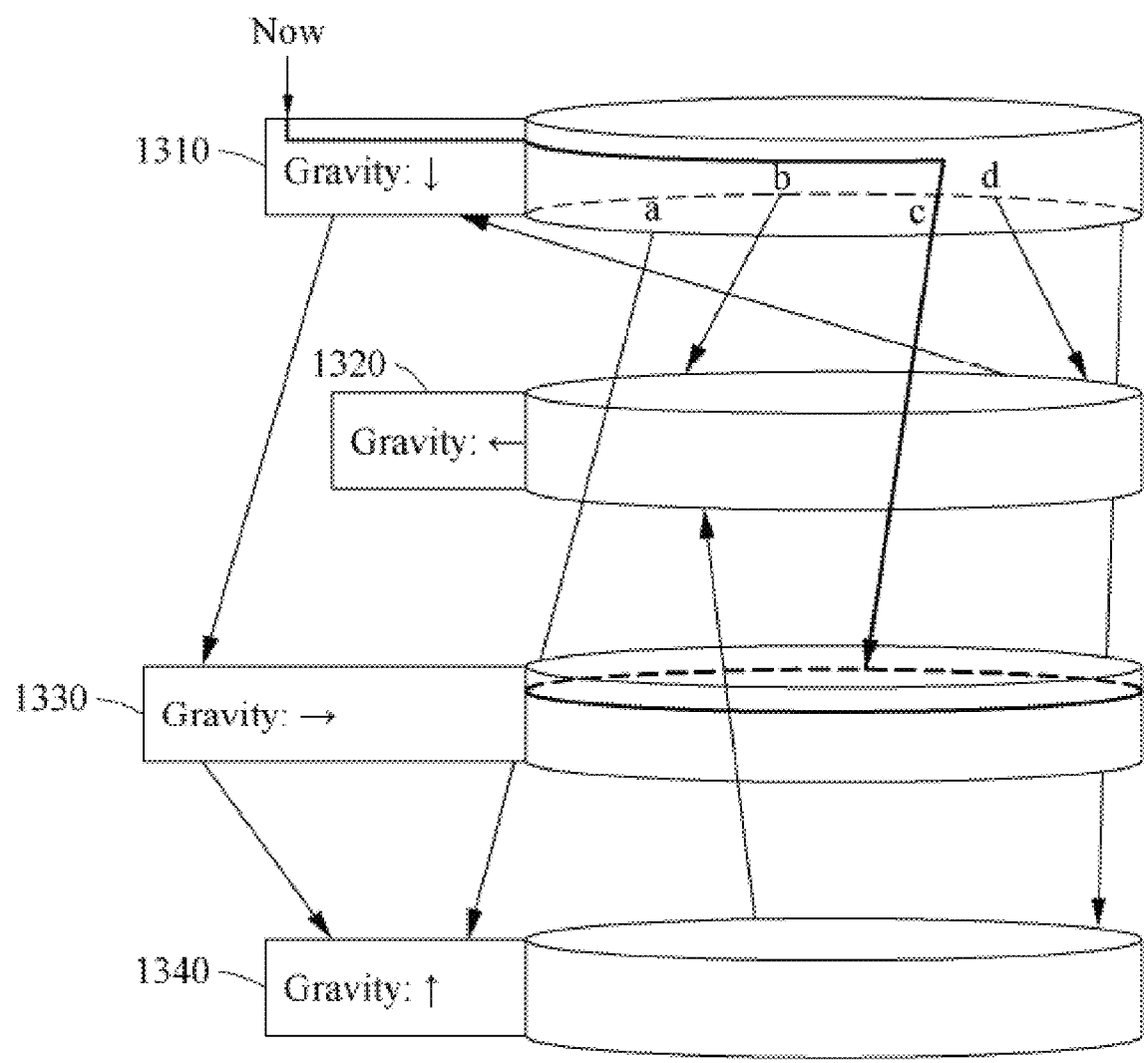
FIGS. 13A and 13B illustrate examples of a method of searching for a sequence matched to a user input in a run-time processing process in accordance with an embodiment.
Figure 13B:
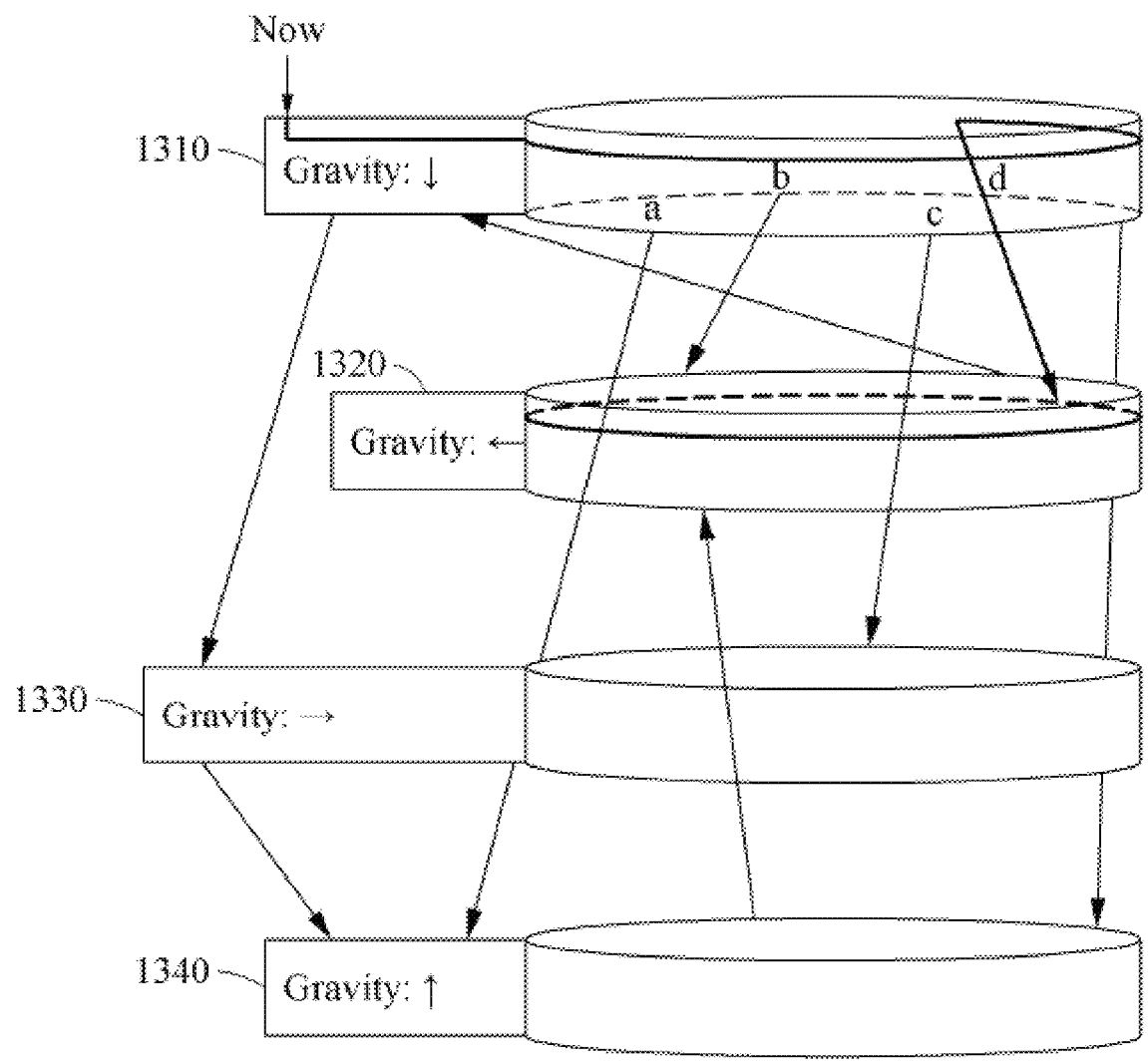

FIGS. 13A and 13B illustrate examples of a method of searching for a sequence matched to a user input in a run-time processing process in accordance with an embodiment. For example, FIGS. 13A and 13B illustrate examples of sequences and paths retrieved corresponding to a new user input in a fluid animation graph including a plurality of sequences 1310, 1320, 1330, and 1340.

For example, in these examples it is assumed that a user input to move a boat from left to right is received during a time period when a modeling apparatus is replaying frames included in the current sequence 1310 representing a movement of the boat when a force is applied from top to bottom in rough seas.

In such an example, the modeling apparatus may search for a sequence having a tag matched to the user input among the sequences 1310, 1320, 1330, and 1340 illustrated in the example of FIG. 13A. When the sequence having the tag matched to the user input is retrieved and determined to be the sequence 1330, the modeling apparatus may then search for a shortest transition path from the current sequence 1310 that is being replayed to the retrieved sequence 1330 in the fluid animation graph.

In such an example, the modeling apparatus may verify/determine whether a current frame being replayed corresponds to a frame transitioning from a current sequence to a sequence that was matched to the user input. In response to a verification/determination that the current frame being replayed corresponds to the frame transitioning from the current sequence to the sequence that was matched to the user input, the modeling apparatus may replay the frames included in the sequence that was matched to the user input based on a transition edge to transition between the current sequence and the sequence that was matched to the user input. Alternatively, in response to the verification/determination that the current frame being replayed does not correspond to the frame transitioning from the current sequence to the sequence that was matched to the user input, the modeling apparatus may provide the current sequence until the current frame being replayed corresponds to the frame transitioning to the sequence that was matched to the user input.

When a transition edge from a frame c of the sequence 1310 to the sequence 1330 is retrieved as being present, the modeling apparatus may replay the sequence 1330 connected to the frame c of the sequence 1310 through the transition edge. Unless an additional user input is received during a replaying of the sequence 1330, the modeling apparatus may recursively replay a circulating sequence in the sequence 1330 that was matched to the user input.

In an example, it is assumed that the modeling apparatus replays the current sequence 1310 representing a movement of the boat when the gravity is applied from top to bottom in rough seas. In this example, the modeling apparatus may recursively replay the circulating sequence in the current sequence 1310 representing the movement of the boat when the gravity is applied from top to bottom in rough seas until an additional user input is received. It is assumed in this example that a user input to move the boat from right to left is received during a recursive replay of the circulating sequence in the current sequence 1310.

For example, the modeling apparatus may search for a sequence having a tag matched to the user input from among the sequences 1310, 1320, 1330, and 1340 as illustrated in the example of FIG. 13B. When the sequence having the tag matched to the user input is retrieved and determined to be the sequence 1320, the modeling apparatus may also search for the shortest transition path from the current sequence 1310 that is being replayed to the retrieved sequence 1330 in the fluid animation graph.

When the transition edge from a frame d of the sequence 1310 to the sequence 1320 is determined, by searching, to be the shortest transition path, the modeling apparatus may replay the sequence 1320 connected to the frame d of the sequence 1310 through the transition edge. Accordingly, the modeling apparatus may iteratively replay the sequence 1320 until a new user input is received during the replay of the sequence 1320.

FIG. 14 is a flowchart illustrating an example of a modeling method in accordance with an embodiment. FIG. 14 illustrates a process that includes a pre-computation performed in advance and a run-time processing that is performed in real time by a modeling apparatus. In operation 1410, the process generates sequences corresponding to a predetermined modeling set. For example, the modeling apparatus generates sequences corresponding to a predetermined modeling set.

In operation 1420, the process adds at least one tag corresponding to the sequences. For example, the modeling apparatus adds at least one tag corresponding to the sequences.

In operation 1430, the process generates a circulating sequence that is recursive in the at least one sequence. For example, the modeling apparatus generates a circulating sequence that is recursive in the at least one sequence. In an example, the modeling apparatus may generate the circulating sequence based on first similarities among frames included in the at least one sequence among the sequences.

In operation 1440, the process generates a transition edge indicating a possible moving path among the sequences. For example, the modeling apparatus generates a transition edge indicating a possible moving path among the sequences. In an example, the modeling apparatus may generate the transition edge based on second similarities between the frames included in the at least one sequence among the sequences and frames included in remaining sequences.

In operation 1450, the process generates a fluid animation graph based on the transition edge. For example, the modeling apparatus generates a fluid animation graph based on the transition edge. Operations 1410 through 1450 are performed in advance as processes of preprocessing. In an example, the fluid animation graph generated as a result of the processes of the preprocessing is stored in a memory of the modeling apparatus.

In operation 1460, the process receives a user input in the run-time processing process. For example, the modeling apparatus receives a user input in the run-time processing process.

In operation 1470, the process selects a sequence having a tag matched to the user input from among the sequences included in the fluid animation graph. For example, the modeling apparatus selects a sequence having a tag matched to the user input from among the sequences included in the fluid animation graph. In operation 1480, the process searches for a transition path, for example, a shortest transition path, from a current sequence being replayed to the selected sequence.

For example, the modeling apparatus searches for a transition path, for example, a shortest transition path, from a current sequence being replayed to the selected sequence.

In operation 1490, the process models a movement corresponding to the user input based on the retrieved shortest transition path. For example, the modeling apparatus models a movement corresponding to the user input based on the retrieved shortest transition path.

For example, it is assumed in an example that a movement of a boat is controlled in response to the user input received by the modeling apparatus in a scene in which the boat floats on the sea. In this example, the movement of the boat that is controlled in response to the user input and a circumstance in which waves and spray occur due to an interaction between the boat and the sea may be modeled accordingly.

Thus, in such an example, when the movement of the boat is controlled in three types of movement directions, for example, a left-turn type of direction, a right-turn type of direction, and a non-rotating type of direction, the modeling apparatus may generate seven sequences to be controlled in response to a user input by combining the three types of movement directions in the preprocessing process. For example, the modeling apparatus may generate seven sequences including a left-turn continuation, a right-turn continuation, a non-rotating continuation, a right turn during a non-rotating continuation, a left turn during a non-rotating continuation, a non-rotating movement during a right turn continuation, and a right turn during a non-rotating continuation. Thus, the modeling apparatus generates sequences corresponding to each possible motion scenario candidate. In this example, the modeling apparatus may add a tag corresponding to a sequence among the seven sequences to be controlled.

For example, the modeling apparatus generates an optimal circulating sequence for enabling a consecutive replaying in a sequence by comparing similarities among the frames included in a sequence with respect to each of the seven sequences.

The modeling apparatus may generate a transition edge based on similarities between frames included in at least one sequence from among seven different sequences and frames included in the six other remaining sequences. The modeling apparatus may generate the fluid animation graph by combining circulating sequences and identifying where a transition edge among different sequences is appropriate.

Subsequently, when the user input in the run-time processing process is received by an input device combined or interconnected to a user apparatus, such as, for example, a user terminal, a joystick, an HMD, the modeling apparatus may search for a sequence having a tag matched to the user input by changing the user input into a display type indicator. For example, such a display type indicator may be a pre-arranged binary code or a hexadecimal code. Also, the provided examples of input devices are only examples and other input devices are used in other examples, as appropriate. In such an example, the modeling apparatus may determine a direction in which a deformable body, for example, a boat, is controlled based on the user input. For example, the modeling apparatus may select a sequence corresponding to the direction in which the boat is controlled based on the user input, from among the sequences included in the fluid animation graph. In this example, the fluid animation graph may control the movement of the deformable body, and include a plurality of sequences that correspond to a plurality of scenarios that reflect a movement of a fluid due to the movement of the deformable body.

In such an example, the modeling apparatus may search for a transition edge from a current sequence that is being replayed to the selected sequence. For example, when the user input is received during a replay of a sequence that corresponds to a non-rotating continuation, the modeling apparatus may select a sequence that has a tag matched to a direction in which the boat is controlled based on the user input. For example, such a direction corresponds to a right turn or a left turn, from among sequences included in a pre-generated fluid animation graph. The modeling apparatus may search for a transition path from the current sequence being replayed to the selected sequence, and continues to perform modeling by transitioning the sequence based on the transition edge.

Figure 15:
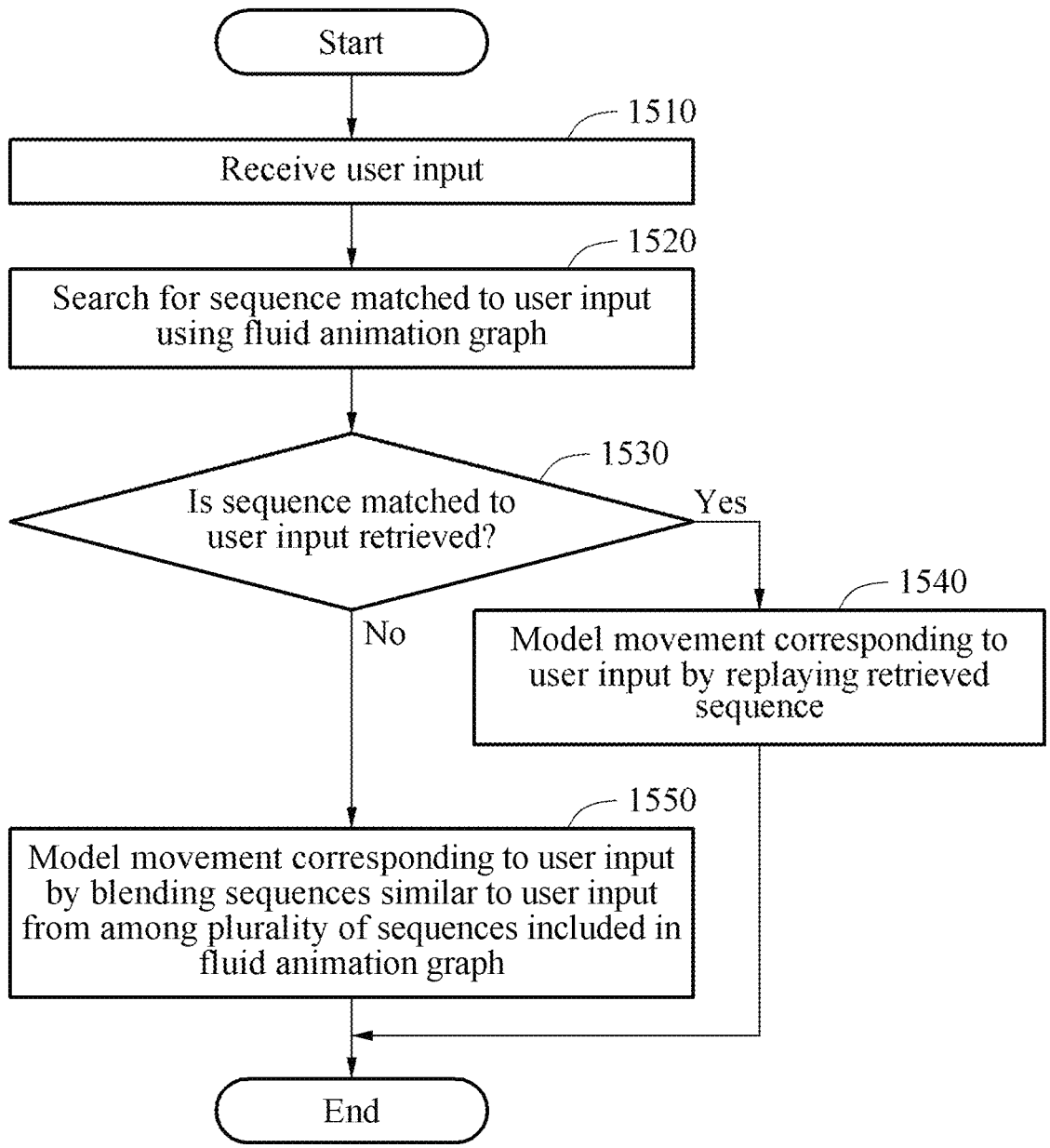
FIG. 15 is a flowchart illustrating another example of a run-time processing process in accordance with an embodiment.

FIG. 15 is a flowchart illustrating another example of a run-time processing process in accordance with an embodiment. Referring to FIG. 15, a process receives a user input in operation 1510, and searches for a sequence matched to the user input using a fluid animation graph in operation 1520. For example, a modeling apparatus receives a user input in operation 1510, and searches for a sequence matched to the user input using a fluid animation graph in operation 1520.

In operation 1530, the process verifies/determines whether the sequence matched to the user input is retrieved. For example, the modeling apparatus verifies whether the sequence matched to the user input is retrieved. In an example, the modeling apparatus may search for the sequence matched to the user input based on, for example, tag information added to the sequence. Based on a result of the verifying in operation 1530 that the sequence matched to the user input is retrieved, the process models a movement corresponding to the user input by replaying the retrieved sequence in operation 1540. For example, the modeling apparatus models a movement corresponding to the user input by replaying the retrieved sequence in operation 1540.

Based on the result of the verifying in operation 1530 that the sequence matched to the user input is not retrieved, the process models the movement corresponding to the user input by blending sequences similar to the user input from among a plurality of sequences included in the fluid animation graph in operation 1550. For example, the modeling apparatus models the movement corresponding to the user input by blending sequences similar to the user input from among a plurality of sequences included in the fluid animation graph in operation 1550. In an example, the modeling apparatus may blend the sequences that are similar to the user input based on at least one of velocity information and form information of the plurality of sequences included in the fluid animation graph. A method in which the modeling apparatus models the movement that corresponds to the user input by blending the sequences similar to the user input based on the form information of the plurality of sequences is described further with reference to FIGS. 16 through 18.

Figure 16:
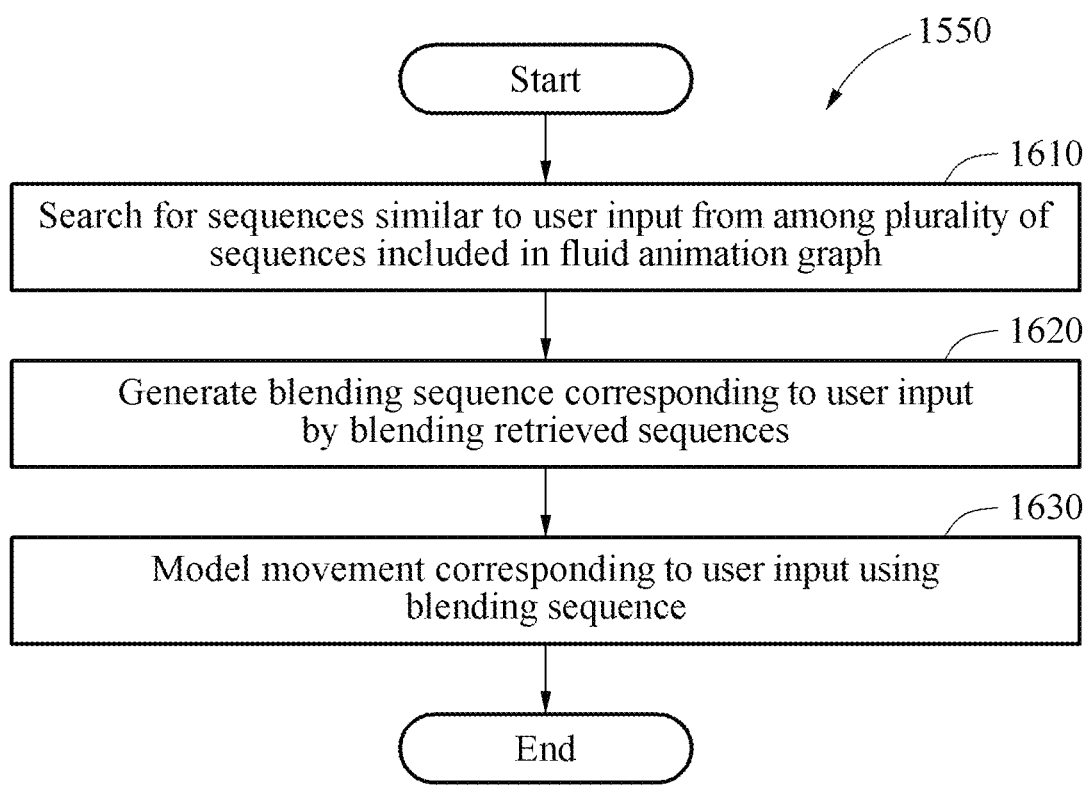
FIG. 16 is a flowchart illustrating an example of a modeling a movement corresponding to a user input by blending sequences similar to the user input in accordance with an embodiment.

FIG. 16 is a flowchart illustrating an example of a modeling a movement corresponding to a user input by blending sequences similar to the user input in accordance with an embodiment. FIG. 16 illustrates an example that may correspond to operation 1550 as illustrated in FIG. 15. In operation 1610, the process searches for sequences similar to a user input from among a plurality of sequences included in a fluid animation graph. For example, a modeling apparatus searches for sequences similar to a user input from among a plurality of sequences included in a fluid animation graph. The modeling apparatus searches for the sequences similar to the user input based on at least one tag added to the plurality of sequences. The "sequence(s) similar to the user input" are to be understood as including sequences generated by the modeling apparatus to correspond to the user input based on a combination of sequences in addition to sequence(s) of which a physical quantity is similar to the user input.

For example, it is assumed in an example that a sequence of a downward direction ↓, a sequence of a right direction →, a sequence of a left direction ←, and a sequence of an upward direction ↑ are included in the fluid animation graph, and a right downward direction of 45 degrees between a right direction → and a downward direction ↓ is input as the user input.

In an example, the tag added to each of the sequences may include a meaning or an annotation of a corresponding sequence, and also a parameterized value of identification information associated with the sequences. The modeling apparatus may search for sequences, for example, the sequence of the downward direction ↓ and the sequence of the right direction →, that are similar to a right downward direction of 45 degrees between a right direction → and a downward direction ↓ by searching for the tag added to each sequence or the parameterized value included in the tag.

In another example, it is assumed that a sequence of which an amount of an external force applied from a left side has a value of 10, a sequence of which the amount of the external force applied from the left side has a value of 50, and a sequence of which an amount of an external force applied from a right side has a value of 20 are included in the fluid animation graph. In response to an amount of an external force from the left side assigned as the user input being 35, the modeling apparatus may search for the tag added to each sequence, and search for and identify the sequence of which the external force applied from the left side is 10 and the sequence of which the external force applied from the left side is 50, as the sequences most similar to the user input.

The modeling apparatus may search for the sequences similar to the user input based on similarities, for example, a form similarity, an energy similarity, and a frame similarity, between the user input and the plurality of sequences. Such types of similarity have been discussed in further detail, above, and further discussion of these similarities is omitted here, for brevity.

In operation 1620, the process generates a blending sequence corresponding to the user input by blending the retrieved sequences. For example, the modeling apparatus generates a blending sequence corresponding to the user input by blending the retrieved sequences. The "blending" is to be understood as including performing interpolation of sequences in addition to performing mixing of the sequences. Such blending allows leveraging of pre-generated sequences to aid in the production of sequences that use information previously pre-generated in separate sequences. A method of generating the blending sequence by the modeling apparatus is described further with reference to FIGS. 17 and 18.

In operation 1630, the process models the movement corresponding to the user input using the blending sequence. For example, the modeling apparatus models the movement corresponding to the user input using the blending sequence.

Figure 17:
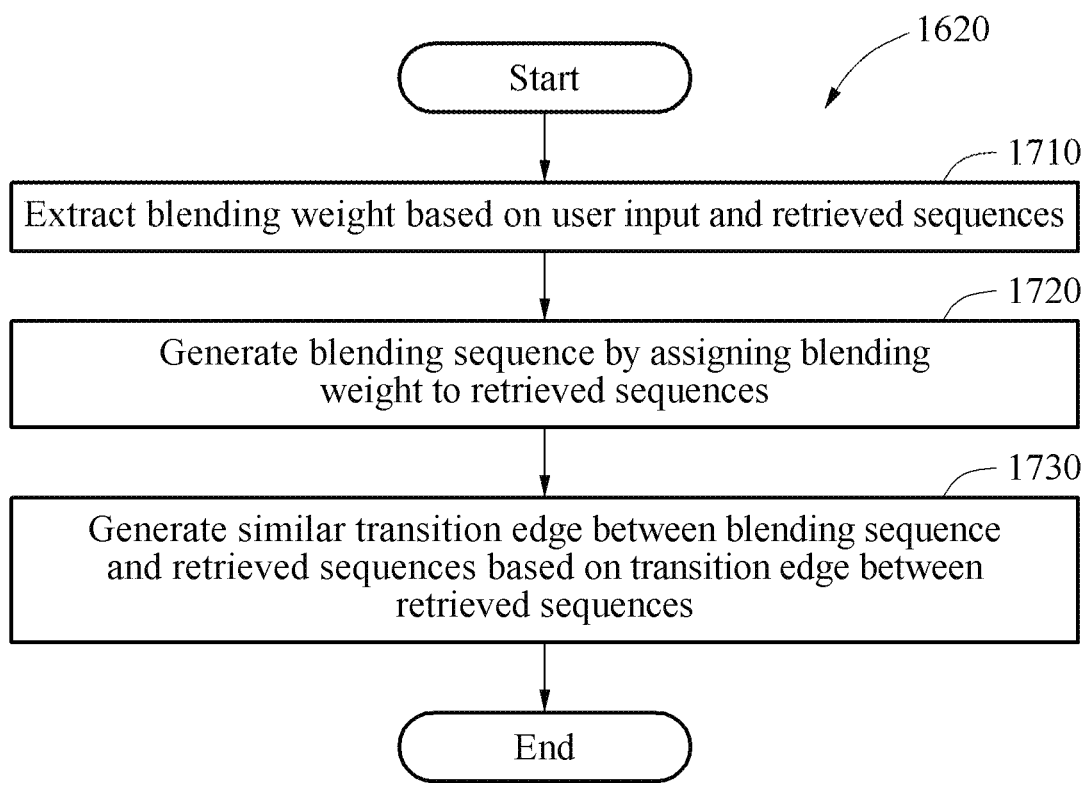
FIG. 17 is a flowchart illustrating an example of a method of generating a blending sequence in accordance with an embodiment.
Figure 18:
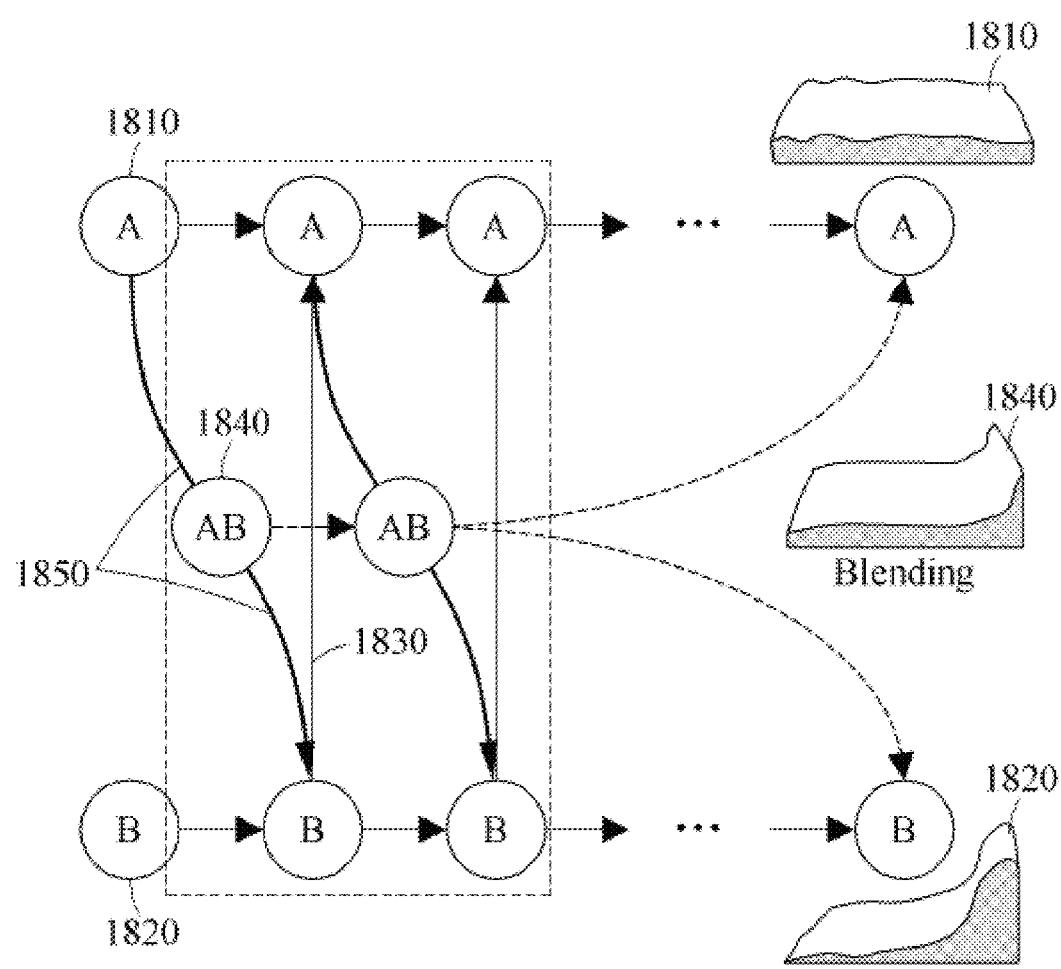
FIG. 18 illustrates an example of a method of generating a blending sequence in accordance with an embodiment.

FIG. 17 is a flowchart illustrating an example of a method of generating a blending sequence in accordance with an embodiment. FIG. 17 illustrates an example that may correspond to operation 1620 as illustrated in FIG. 16. FIG. 18 illustrates an example of a method of generating a blending sequence in accordance with an embodiment.

Referring to the example of FIG. 17, in operation 1710, a process extracts a blending weight based on a user input and retrieved sequences. For example, a modeling apparatus extracts a blending weight based on a user input and retrieved sequences. In operation 1720, the process generates a blending sequence by assigning the blending weight to the retrieved sequences. For example, the modeling apparatus generates a blending sequence by assigning the blending weight to the retrieved sequences.

Aspects of the process of FIG. 17 are illustrated by example of FIG. 18. For example, in an example is assumed that a sequence A 1810 indicating that an external force applied from a left side has a value of 10 and a sequence B 1820 indicating that the external force applied from the left side has a value of 50 are retrieved as sequences similar to the user input, for example, an amount of an external force applied from a left side having a value of 35. In this example, the sequence A 1810 includes a parameterized value corresponding to an amount of an external force applied from the left side having a value of 10, and the sequence B 1820 includes a parameterized value corresponding to an amount of the external force applied from the left side having a value of 50.

The modeling apparatus may obtain a sequence corresponding to user input, for example, the amount of the external force applied from a left side having a value of 35, by multiplying 3.5 by the sequence A 1810 indicating that the amount of the external force is 10 or multiplying 0.7 by the sequence B 1820 indicating that the amount of the external force is 50. Here, 3.5 or 0.7 corresponds to the blending weight, which is based on the various values of relevant forces.

In such an example, the modeling apparatus may extract the blending weight having a value of 3.5 for the sequence A 1810 or the blending weight having a value of 0.7 for the sequence B 1820 and newly generate a sequence AB 1840 by assigning the blending weight having a value of 3.5 to the parameterized external force having a value of 10 of the sequence A 1810 or assigning the blending weight having a value of 0.7 to the parameterized external force having a value 50 of the sequence B 1820.

In operation 1730, the process generates similar transition edges between the blending sequence and the retrieved sequences based on a transition edge between the retrieved sequences. For example, the modeling apparatus generates similar transition edges between the blending sequence and the retrieved sequences based on a transition edge existing between the retrieved sequences. For example, it is assumed in such an example that a transition edge 1830 is present between the sequence A 1810 and the sequence B 1820. Accordingly, the modeling apparatus may generate a transition edge 1850 starting from the sequence A 1810, of which the blending weight is relatively great, toward the sequence B 1820, of which the blending weight is relatively small, through the generated blending sequence AB 1840.

In an example, the modeling apparatus generates the blending sequence, during a transition, based on a transition edge among the retrieved sequences. The modeling apparatus may combine the blending sequence and the sequences included in the fluid animation graph based on the similar transition edges.

Figure 19:
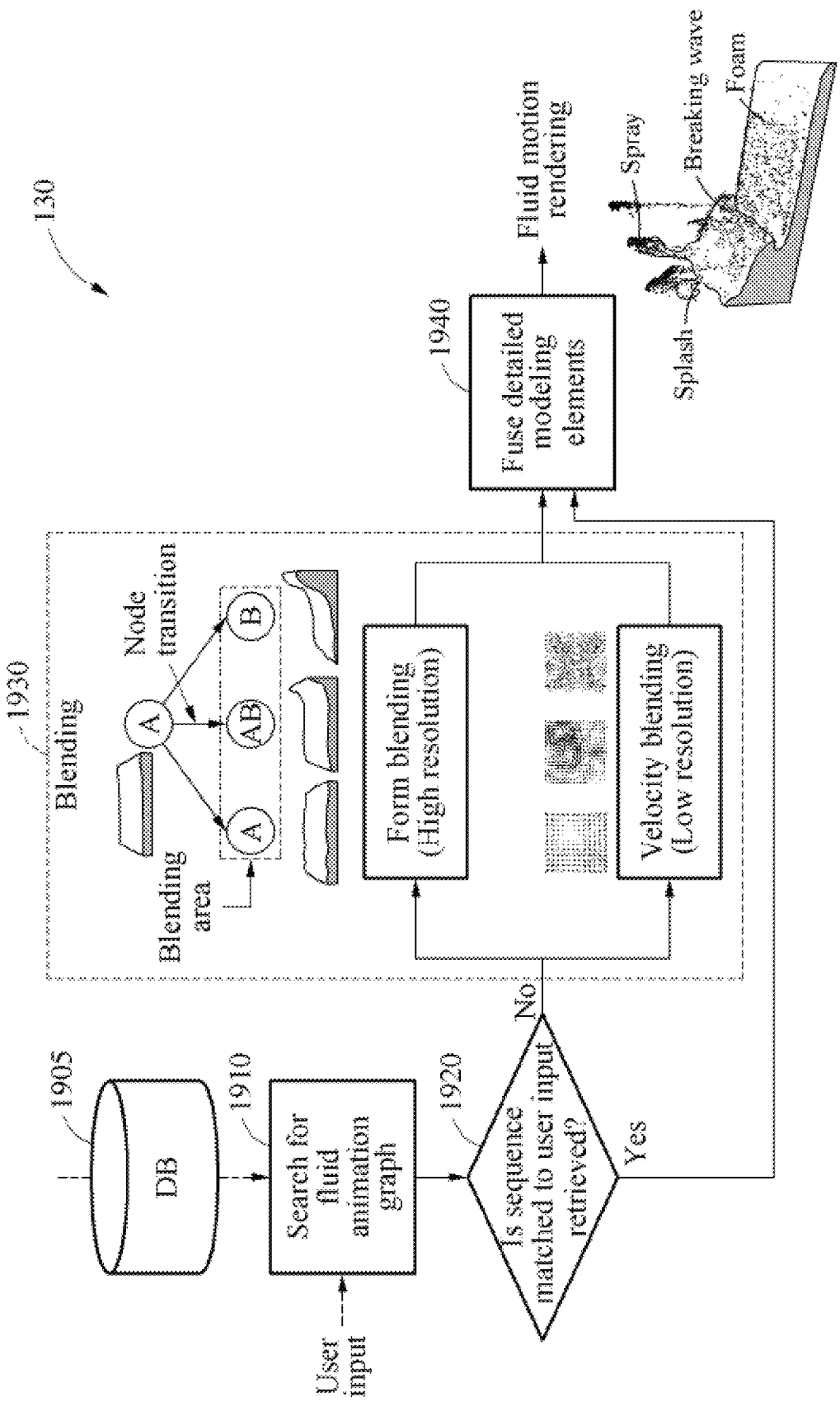
FIG. 19 illustrates another example of a modeling method in accordance with an embodiment.

FIG. 19 illustrates another example of a modeling process in accordance with an embodiment. In operation 1910, the process searches for a fluid animation graph stored in a database (DB) 1905 in response to a user input received. For example, a modeling apparatus searches for a fluid animation graph stored in a database (DB) 1905 in response to a user input received. In operation 1920, the process verifies/determines whether a sequence matched to the user input is retrieved or retrievable from among a plurality of sequences included in the fluid animation graph. For example, the modeling apparatus verifies whether a sequence matched to the user input is retrieved from among a plurality of sequences included in the fluid animation graph.

Based on a result of the verifying in operation 1920 that the sequence matched to the user input is retrieved, the process fuses detailed modeling elements in the retrieved sequence and replays the retrieved sequence in which the detailed modeling elements are fused in operation 1940. For example, the modeling apparatus fuses detailed modeling elements in the retrieved sequence and replays the retrieved sequence in which the detailed modeling elements are fused in operation 1940. The detailed modeling elements include, for example, a splash element based on a form curvature of the retrieved sequence, a spray element based on a velocity of the retrieved sequence, a foam element based on form information and velocity information of the retrieved sequence, and a spray-foam transition element based on particle tracking. However, these are only examples and other detailed modeling elements are used in other examples, as appropriate.

Based on the result of the verifying in operation 1920 that the sequence matched to the user input is not retrieved, the process blends sequences similar to the user input among the plurality of sequences included in the fluid animation graph in operation 1930. For example, the modeling apparatus blends sequences similar to the user input among the plurality of sequences included in the fluid animation graph in operation 1930. In operation 1930 of blending, the modeling apparatus may generate a blending sequence by blending the sequences similar to the user input based on the form information and the velocity information of the sequences, or form information and velocity information of each frame included in a sequence. In other examples, additional information is used to supplement the form information and velocity information, as appropriate. A method of blending the sequences based on the form information by the modeling apparatus is described further with reference to FIGS. 17 and 18.

A visible effect of the velocity information may be small in comparison to the form information. However, the velocity information may require triple the volume of data since three images corresponding to an x-axis, a y-axis, and a z-axis need to be stored. As part of its operation, the modeling apparatus may blend the sequences that are similar to the user input based on the velocity information of the sequences. For example, the modeling apparatus performs a method of blending by assigning a weighting based on the velocity information associated with a currently stored sequence.

For example, the modeling apparatus may perform blending in high-resolution based on the form information because a visible effect of the form information is relatively great, and perform blending in low-resolution based on the velocity information since the visible effect of the velocity information is relatively small.

In operation 1940, the process fuses the detailed modeling elements in the sequence including the blending sequence and replays the sequence in which the detailed modeling elements are fused. For example, the modeling apparatus fuses the detailed modeling elements in the sequence including the blending sequence and replays the sequence in which the detailed modeling elements are fused.

FIG. 20 is a block diagram illustrating an example of a modeling apparatus in accordance with an embodiment. Referring to the example of FIG. 20, a modeling apparatus 2000 includes a memory 2010, a processor 2020, and a receiver 2030. In various examples, the modeling apparatus 2000 may include the preprocessor 2040 or may not include the preprocessor 2040. Additionally, in various examples, the modeling apparatus 2000 optionally also includes other computing components that aid in its ability to perform modeling. In FIG. 20, arrows represent paths of data exchange between parts of the modeling apparatus 2000.

The memory 2010 stores the sequences generated in the preprocessor 2040 or otherwise generated by the modeling apparatus 2000 and a fluid animation graph. The sequences include a plurality of frames. The memory 2010 may be a volatile memory or a non-volatile memory.

The processor 2020 searches for a sequence matched to a user input using the fluid animation graph and models a movement corresponding to the user input based on a result of the searching.

The processor 2020 selects a sequence having a tag matched to the user input from among the sequences included in the fluid animation graph and searches for a transition edge from a current sequence being replayed to the selected sequence.

The processor 2020 replays the retrieved sequence, in response to the sequence matched to the user input being retrieved. In this example, the retrieved sequence may include a plurality of consecutive frames representing a movement of a deformable body corresponding to the user input and a movement of a fluid due to the movement of the deformable body.

The processor 2020 determines a direction in which the deformable body is controlled based on the user input and selects a sequence corresponding to the direction among the sequences included in the fluid animation graph. Also, the processor 2020 searches the transition path from the current sequence being replayed to the selected sequence.

In response to the sequence matched to the user input not being retrieved, the processor 2020 models the movement corresponding to the user input by blending sequences similar to the user input from among a plurality of sequences included in the fluid animation graph.

Then, the processor 2020 blends the sequences similar to the user input based on at least one of velocity information and form information of the plurality of sequences included in the fluid animation graph.

The processor 2020 also searches for the sequences similar to the user input from among the plurality of sequences included in the fluid animation graph, and generates a blending sequence corresponding to the user input by blending the retrieved sequences. Then, the processor 2020 models the movement corresponding to the user input by using the blending sequence.

The processor 2020 searches for the sequences similar to the user input based on at least one tag added to the plurality of sequences.

The processor 2020 also extracts a blending weight based on the retrieved sequences and the user input, and generates the blending sequence by assigning the blending weight to the retrieved sequences.

Further, the processor 2020 generates similar transition edges between the blending sequence and the retrieved sequences based on a transition edge among the retrieved sequences.

Also, the processor 2020 replays frames included in the retrieved sequences, and verifies/determines whether a current frame being replayed corresponds to a frame transitioning from the retrieved sequence to the blending sequence. The processor 2020 replays the frames included in the blending sequence based on the similar transition edges previously generated between the blending sequence and the retrieved sequences.

The receiver 2030 receives the user input.

For example, the processor 2020 may perform at least one method of the aforementioned methods expressed in various ways with respect to FIGS. 1 through 19, or any combination of these figures.

In an example, the processor 2020 executes a program, for example, an application program, and controls the modeling apparatus 2000. For example, such a program code executed by the processor 2020 may be stored in the memory 2010. In an example, the modeling apparatus 2000 may be connected to an external apparatus, for example, a personal computer (PC) or a network, through an input and output device and exchanges data accordingly.

The preprocessor 2040 generates sequences corresponding to a predetermined modeling set and generates the fluid animation graph based on similarities between the frames included in the sequences. The preprocessor 2040 also adds at least one tag corresponding to the sequences. For example, the at least one tag is defined based on a user input, an external force, an inflow and disappearance of a fluid, and an interaction with another object.

Additionally, the preprocessor 2040 calculates at least one similarity among the frames included in the sequences. The preprocessor 2040 assigns a weight to the at least one similarity and generates the fluid animation graph based on a weighted sum of the at least one similarity to which the weight is assigned.

The preprocessor 2040 also calculates first similarities among the frames included in the at least one sequence among the sequences, and generates a circulating sequence that is recursive in the at least one sequence based on the first similarities.

Furthermore, the preprocessor 2040 generates a transition edge indicating a possible moving path among the sequences based on second similarities between the frames included in the at least one sequence from among the sequences and frames included in remaining sequences. The preprocessor 2040 generates the fluid animation graph based on the generated transition edge. The preprocessor 2040 may perform any or any combination of the aforementioned operations of FIGS. 1-19.

In the example of FIG. 20, the memory 2010, the processor 2020, the receiver 2030, and the preprocessor 2040 communicate with each other through a bus, or they may communicate wirelessly.

In an example, the modeling apparatus 2000 may include the memory 2010, the processor 2020, and the receiver 2030. In this example, the preprocessor 2040 is disposed on an outer surface, or exterior, of the modeling apparatus 2000, to act as an additional preprocessor. The sequences and the fluid animation graph generated in the preprocessor 2040 may be stored or updated in the memory 2020.

Depending on an embodiment, the modeling apparatus 2000 stores data in or is connected to various digital devices, such as mobile devices, and provides, in an image application, a movement having a sense of reality based on responding to the user input in real time.

The apparatuses, units, modules, devices, and other components illustrated in FIGS. 1-20 that perform the operations described herein with respect to FIGS. 1-20 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-20. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-20 that perform the operations described herein with respect to FIGS. 1-20 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented modeling method, the method comprising:
   generating a fluid animation graph by performing a frame-by-frame comparison of a plurality of image frames included in one or more image sequences, determining similarities between two or more consecutive image frames of the plurality of image frames included in the one or more image sequences by comparing similarities between the two or more consecutive image frames with a reference value, and generating a circulating sequence that is recursive in the one or more image sequences based on the determined similarities;
   receiving, from an input device, a user input corresponding to a movement of an object;
   searching for an image sequence matched to the user input using the fluid animation graph; and
   modeling the movement of the object based on a result of the searching,
   wherein, in the searching, the two or more consecutive image frames of the one or more sequences are matched to the movement corresponding to the user input.

2. The method of claim 1, wherein the modeling includes modeling the movement corresponding to the user input by blending sequences including image frames similar to the user input from among the one or more sequences included in the fluid animation graph when a determination is made that the user input does not match the consecutive image frames included in the fluid animation graph.

3. The method of claim 2, wherein the modeling includes blending the sequences including the image frames that are similar to the user input based on at least one of velocity information and form information of the two or more consecutive image frames included in the sequences included in the fluid animation graph.

4. The method of claim 2, wherein the modeling comprises:
   searching for retrieved sequences that include image frames that are similar to the user input from among the sequences included in the fluid animation graph;
   generating a blending sequence corresponding to the user input by blending the retrieved sequences; and
   modeling the movement corresponding to the user input using the blending sequence.

5. The method of claim 4, wherein the searching for the retrieved sequences that include image frames that are similar to the user input includes searching for the retrieved sequences that include image frames that are similar to the user input based on a tag added to the sequences included in the fluid animation graph.

6. The method of claim 4, wherein the generating of the blending sequence comprises:
   generating a blending weight based on the retrieved sequences and the user input; and
   generating the blending sequence by assigning the blending weight to the retrieved sequences.

7. The method of claim 6, wherein the generating of the blending sequence includes generating a transition edge between the blending sequence and the retrieved sequences based on a transition edge existing between the retrieved sequences.

8. The method of claim 7, wherein the modeling comprises:
   replaying frames included in the retrieved sequences;
   verifying that a current frame being replayed corresponds to a frame transition from at least one of the retrieved sequences to the blending sequence; and
   replaying frames included in the blending sequence based on the transition edge between the blending sequence and the retrieved sequences.

9. The method of claim 6, wherein the generating of the blending sequence includes generating the blending sequence during a transition based on a transition edge between the retrieved sequences.

10. The method of claim 1, wherein the modeling includes replaying frames included in the retrieved sequence in response to the retrieved sequence being matched to the user input,
    wherein the retrieved sequence includes consecutive frames that represent a movement of a deformable body that corresponds to the user input, and a movement of a fluid in response to the movement of the deformable body.

11. The method of claim 1, wherein the searching comprises:
    selecting a sequence having a tag matched to the user input from among the sequences included in the fluid animation graph; and
    searching for a transition path from a current sequence being replayed to the selected sequence.

12. The method of claim 1, wherein the searching comprises:
    determining a direction in which a deformable body is controlled based on the user input;
    selecting a sequence corresponding to the direction from among the sequences included in the fluid animation graph; and
    searching for a transition path from a current sequence being replayed to the selected sequence.

13. The method of claim 1, wherein the fluid animation graph is configured to control a movement of a deformable body and includes sequences corresponding to scenarios reflecting a movement of a fluid due to the movement of the deformable body.

14. The method of claim 1, wherein the fluid animation graph comprises at least one of:
    a circulating sequence generated based on first similarities among image frames included in at least one sequence from among the sequences included in the fluid animation graph, the circulating sequence being recursive in the at least one sequence; and
    a transition edge generated based on second similarities between the image frames included in the at least one sequence from among the sequences included in the fluid animation graph and image frames included in remaining sequences of the sequences included in the fluid animation graph, the transition edge indicating a possible moving path between the sequences.

15. The method of claim 1, wherein the modeling comprises:
replaying image frames in a current sequence;
verifying that a current image frame being replayed corresponds to an image frame transitioning from the current sequence to the one or more sequences matched to the user input; and
replaying frames in the one or more sequences matched to the user input based on a transition edge, to transition between the current sequence and the sequence matched to the user input.

16. The method of claim 15, wherein the replaying of the image frames in the current sequence includes recursively replaying a circulating sequence in the current sequence.

17. The method of claim 15, wherein the replaying of the image frames in the one or more sequences matched to the user input includes recursively replaying a circulating sequence in the one or more sequences matched to the user input until an additional user input is received.

18. The method of claim 1, wherein the similarities among the frames is based on a similarity between consecutive frames included in the sequence of frames.

19. The method of claim 1, further comprising assigning weights to the similarities, and generating the fluid animation graph based on a weighted sum of the similarities to which the weights are assigned.

20. A non-transitory computer-readable storage medium storing instructions for causing computing hardware to perform the method of claim 1.

21. A modeling apparatus comprising:
a memory configured to store sequences corresponding to a modeling set, wherein each of the sequences includes frames, and store a fluid animation graph pre-generated based on similarities among the frames included in the sequences included in the fluid animation graph; and
a processor configured to search for a sequence matched to a user input from an input device based on the fluid animation graph and model a movement corresponding to the user input based on a result of the searching,
wherein the frames include one or more of image frames and special-effect frames, and
wherein the fluid generation graph is generated by performing a frame-by-frame comparison of a plurality of image frames included in each of the sequences, determining similarities between two or more consecutive image frames of the image frames included in the sequences by comparing similarities between two or more consecutive image frames with a reference value, and generating a circulating sequence that is recursive in the sequences based on the determined similarities.

22. The apparatus of claim 21, wherein the processor is configured to model the movement corresponding to the user input by blending sequences including image frames similar to the user input from among one or more sequences included in the fluid animation graph when a determination is made, in the search, that the user input does not match the sequences of image frames included in the fluid animation graph.

23. The apparatus of claim 22, wherein the processor is configured to blend the sequences including the image frames that are similar to the user input based on at least one of velocity information and form information of the image frames included sequences included in the fluid animation graph.

24. The apparatus of claim 22, wherein the processor is configured to search for retrieved sequences that include image frames that are similar to the user input from among the sequences included in the fluid animation graph, generate a blending sequence corresponding to the user input by blending the retrieved sequences, and model the movement corresponding to the user input using the blending sequence.

25. The apparatus of claim 24, wherein the processor is configured to search for the retrieved sequences including frames that are similar to the user input based on a tag added to the sequences included in the fluid animation graph.

26. The apparatus of claim 24, wherein the processor is configured to generate a blending weight based on the retrieved sequences and the user input, and generate the blending sequence by assigning the blending weight to the retrieved sequences.

27. The apparatus of claim 26, wherein the processor is configured to generate a transition edge between the blending sequence and the retrieved sequences based on a transition edge existing between the retrieved sequences.

28. The apparatus of claim 27, wherein the processor is configured to replay frames included in the retrieved sequences, verify whether a current frame being replayed corresponds to a frame transitioning from at least one of the retrieved sequences to the blending sequence, and replay frames included in the blending sequence based on the similar transition edges to transition between the retrieved sequences and the blending sequence.

29. The apparatus of claim 21, wherein the processor is configured to replay the retrieved sequence in response to the sequence matched to the user input being retrieved and the retrieved sequence includes consecutive frames that represent a movement of a deformable body corresponding to the user input and a movement of a fluid due to the movement of the deformable body.

30. The apparatus of claim 21, wherein the processor is configured to select a sequence having a tag matched to the user input from among the sequences included in the fluid animation graph and search for a transition path from a current sequence being replayed to the selected sequence.

31. The apparatus of claim 21, wherein the processor is configured to determine a direction in which a deformable body is controlled based on the user input, select a sequence corresponding to the direction from among the sequences included in the fluid animation graph, and search for a transition path from a current sequence being replayed to the selected sequence.

32. The apparatus of claim 21, further comprising:
a preprocessor configured to generate the sequences corresponding to the modeling set and generate the fluid animation graph based on the similarities among the frames included in the sequences.

33. The apparatus of claim 21, wherein the preprocessor is configured to calculate at least one similarity between the frames included in the sequences, assign a weight to the at least one similarity, and generate the fluid animation graph based on a weighted sum of the at least one similarity to which the weight is assigned.

34. The apparatus of claim 21, wherein the fluid animation graph is configured to control a movement of a deformable body and includes sequences corresponding to scenarios reflecting a movement of a fluid due to the movement of the deformable body.

35. The apparatus of claim 21, wherein the modeling apparatus further comprises the input device.

36. A processor-implemented modeling method, the method comprising:

generating one or more fluid animation graphs by performing a frame-by-frame comparison of a plurality of image frames included in one or more image sequences, determining similarities between two or more consecutive image frames of the plurality of image frames included in the one or more image sequences by comparing similarities between the two or more consecutive image frames with a reference value, and generating a circulating sequence that is recursive in the one or more image sequences based on the determined similarities;

searching for a fluid animation graph stored in a database, in response to a movement corresponding to a user input from a user device;

retrieving an image sequence matched to the movement corresponding to the user input;

determining whether the retrieved image sequence corresponds to an image sequence included in the fluid animation graph;

in response to the determining indicating that the retrieved sequence matched to the user input is retrieved, fusing detailed modeling elements in the retrieved sequence into a fused sequence; and in response to the determining indicating that the sequence matched to the movement of the user input is not retrieved, retrieving and blending sequences similar to the movement of the user input among the sequences included in the fluid animation graph and fusing detailed modeling elements in the blending sequences into the fused sequence.

37. The method of claim 36, wherein the blending includes form blending performed at a high resolution.

38. The method of claim 36, wherein the blending includes velocity blending performed at a low resolution.

* * * * *